(12) United States Patent
Miyata

(10) Patent No.: US 6,180,719 B1
(45) Date of Patent: Jan. 30, 2001

(54) HEAT-FUSION COMPOSITION AND MULTI-LAYER MOLDED BODY CONTAINING LAYER COMPRISING THE SAME

(75) Inventor: Hirotaka Miyata, Himeji (JP)

(73) Assignee: Daicel Chemical Industries Ltd, Osaka (JP)

(*) Notice: Under 35 U.S.C. 154(b), the term of this patent shall be extended for 0 days.

(21) Appl. No.: 09/117,165

(22) PCT Filed: Nov. 21, 1997

(86) PCT No.: PCT/JP97/04268
§ 371 Date: Jul. 22, 1998
§ 102(e) Date: Jul. 22, 1998

(87) PCT Pub. No.: WO98/22531
PCT Pub. Date: May 28, 1998

(30) Foreign Application Priority Data

Nov. 22, 1996 (JP) .................................................. 8-327901

(51) Int. Cl.$^7$ ...................................................... C08L 63/00
(52) U.S. Cl. ............................................................. 525/108
(58) Field of Search .................................................. 525/108

(56) References Cited

U.S. PATENT DOCUMENTS

| | | | |
|---|---|---|---|
| 4,267,288 | * | 5/1981 | Burkhart ............................ 525/438 |
| 4,316,967 | * | 2/1982 | Hergenrother .................... 525/111 |
| 5,008,334 | * | 4/1991 | Harris ................................. 525/109 |
| 5,216,074 | * | 6/1993 | Imai .................................... 525/66 |
| 5,258,456 | * | 11/1993 | Ochi .................................... 525/90 |
| 5,300,567 | * | 4/1994 | Modie .................................. 525/64 |
| 5,342,885 | * | 8/1994 | Clair .................................... 525/65 |
| 5,349,015 | * | 9/1994 | Pottick ................................. 525/65 |
| 5,382,604 | * | 1/1995 | Erickson ............................. 522/185 |
| 5,393,818 | | 2/1995 | Masse et al. . |
| 5,412,040 | * | 5/1995 | Custro ................................ 525/333.9 |
| 5,461,112 | | 10/1995 | Masse et al. . |

FOREIGN PATENT DOCUMENTS

| | | |
|---|---|---|
| 0367188 | 5/1990 | (EP) . |
| 0564050 | 10/1993 | (EP) . |
| 8-59954 | 3/1996 | (JP) . |
| 8-73829 | 3/1996 | (JP) . |
| WO 9602586 | 2/1996 | (WO) . |

OTHER PUBLICATIONS

Patent Abstracts of Japan, vol. 012, No. 373 (C–534), Oct. 6, 1998, & JP 63 128014 A (Mitsubishi Petrochemical Co., Ltd.) May 31, 1988 (Abstract).

* cited by examiner

Primary Examiner—Edward J. Cain

(57) ABSTRACT

The present invention provides a heat-fusion composition for molding into multi-layers containing a block copolymer (a) having epoxy groups, wherein the heat-fusion composition for molding into multi-layers further comprises 20 to 80% by weight of a block copolymer (a) having epoxy groups and 20 to 80% by weight of at least one kind of thermoplastic elastomer (b) selected from styrene elastomer, polyurethane elastomer, polyester elastomer, polyamide elastomer, polyolefin elastomer and polyvinyl chloride elastomer (with a combined content of (a) and (b) of 100% by weight) along with the block copolymer (a) having epoxy groups and thermoplastic elastomer (b). A multi-layer molded body according to the present invention being excellent in the heat-fusion property can be obtained by allowing the heat-fusion composition for forming into multi-layers to heat-fuse with a hard resin. The molded bodies obtained can be used for a turn table of a CD-ROM driver, a side braid of the door of a car, clips and handles of the electric appliances, spacers, packings, air bag covers, push buttons of the key board of a personal computer, sound damping gear and sports shoes sole and so on.

16 Claims, No Drawings

HEAT-FUSION COMPOSITION AND MULTI-LAYER MOLDED BODY CONTAINING LAYER COMPRISING THE SAME

TECHNICAL FIELD

The present invention relates to a heat-fusion composition for use in a multi-layer molding (referred to a heat-fusion composition hereinafter) and a multi-layer molded body obtained by a double injection molding, an insert molding, a multi-layer extrusion or multi-layer blow molding of a heat-fusion composition and a hard resin. In more detail, the present invention relates to a multi-layer molded body containing a layer comprising a heat-fusion composition composed of a block copolymer having epoxy groups and a thermoplastic elastomer.

BACKGROUND ART

Hard resins and thermoplastic elastomers have been molded into a multi-layers in the conventional art. This multi-layer molding makes use of the function of elastomers such as soft feeling and slip preventive property as a surface skin material, along with integrating the elastomer into a seal material and packing material to obtain a molded body with a good water-proof property. Integrated molding can also save the cost for adhering the hard resin with the thermoplastic resin. Many molded bodies and heat-fusion compositions have been recently proposed through the attempt to improve the fusion property of the hard resins and thermoplastic elastomers.

Japanese Examined Patent Publication No. 4-2412 proposes a multi-layer injection molded body comprising (a) an elastomer of a hydrogenated block copolymer obtained by hydrogenating a block copolymer comprising a polymer block A mainly composed of at least two vinyl aromatic compounds and a polymer block B mainly composed of at least one conjugated diene compound and (b) a resin selected from a polyolefin resin, polystyrene resin and ABS resin. However, the elastomer of hydrogenated block copolymers used in the invention cited herein has no functional groups to enhance the adhesive property, imposing a limitation in the heat-fusion property.

Japanese Unexamined Patent Publications No. 1-139240, No. 1-139241, No. 3-100045, No. 6-65467 and No. 6-107898 propose a method for producing a composite molded body comprising a thermoplastic elastomer composition, in which a styrene-based thermoplastic elastomer having no functional groups is combined with other thermoplastic elastomers, and a hard resin selected from polycarbonate, nylon 11, nylon 12, ABS resin and PMMA resin.

However, the styrene-based thermoplastic elastomers used in the invention cited herein has no functional groups to enhance the adhesive property, rendering the compositions poor adhesive property.

Japanese Unexamined Patent Publication No. 8-59954 proposes a composition in which (a) a hydrogenated block copolymer obtained by hydrogenating a block copolymer comprising a polymer block A mainly composed of at least. one vinyl aromatic compound and a polymer block B mainly composed of at least one conjugated diene compound, and/or a modified hydrogenated elastomer in which the hydrogenated block copolymer is bound with a molecular unit containing a carboxylic acid group or its derivative group, (b) a polystyrene based resin and/or a polyphenylene based polymer and (c) a thermoplastic elastomer comprising an ethylene—unsaturated carboxylic acid ester copolymer are laminated on a resin mainly composed of the resin (b). Although the heat-fusion property of the modified hydrogenated block copolymer as used herein has been improved by virtue of functional groups since the resin is modified with a carboxylic acid group or its derivative group, the resin is only able to fuse with so-called modified PPO resins. Accordingly, developments of a heat-fusion resin being able to fuse with an wider range of resins are desired.

The object of the present invention is to provide a heat-fusion composition that contains a block copolymer having epoxy groups and has a heat-fusion property with a hard resin, and a multi-layer molded body in which the layer comprising the heat-fusion composition and a layer comprising various kind of hard resins are strongly heat-fused.

DISCLOSURE OF INVENTION

For the purpose of solving the problems as hitherto described, the inventors of the present invention have extensively and precisely investigated the epoxydized block copolymer compositions having epoxy groups as functional group, finding that an excellent multi-layer molded body can be obtained by taking advantage of heat-fusion properties of a composition containing a block copolymer having epoxy groups, especially a composition comprising a block copolymer having epoxy groups and a specified thermoplastic elastomer, thereby completing the present invention.

The first embodiment according to the present invention provides a heat-fusion composition containing a block copolymer having epoxy groups and a heat-fusion composition comprising a block copolymer having epoxy groups and a thermoplastic elastomer.

The present invention also provides a heat-fusion composition comprising (a) a block copolymer having epoxy groups, for example an epoxydized block copolymer obtained by epoxydizing a block copolymer comprising a polymer block mainly composed of a vinyl aromatic hydrocarbon compound and a polymer block mainly composed of a conjugated diene compound, or its hydrogenated product and (b) at least one kind of thermoplastic elastomer selected from a styrene elastomer, polyurethane elastomer, polyester elastomer, polyamide elastomer, polyolefin elastomer and polyvinyl chloride elastomer, wherein the blending ratio of the component (a) is in the range of 20 to 80% by weight and the blending ratio of the component (b) is in the range of 20 to 80% by weight with a combined amount of (a) and (b) of 100%. The present invention also provides a heat-fusion composition containing (d) 0.01 to 25 parts by weight of a polyfunctional compound containing at least two functional groups reactive to the epoxy group in the molecule and/or (e) 0.001 to 2 parts by weight of an accelerating agent for the curing reaction of epoxy groups per 100 parts by weight of the heat-fusion composition. The present invention further provides a heat-fusion composition comprising (c) 10 to 50 parts by weight of a hard resin and (d) 0.01 to 25 parts by weight of a polyfunctional compound containing at least two functional groups reactive to the epoxy group in the molecule and/or (e) 0.001 to 2 parts by weight of an accelerating agent for the curing reaction of epoxy groups per 100 parts by weight of the heat-fusion composition.

The second embodiment according to the present invention provides a multi-layer molded body composed of a layer comprising the heat-fusion composition according to the first embodiment and the other layer, for example a layer comprising at least one kind of resin selected from an ABS resin, impact resistant polystyrene, polycarbonate, polytmethylmethacrylate, polypropylene, saturated polyester resin, polyamide, polyvinyl chloride and polyphenylene oxide resin. The present invention also provides a multi-layer molded body composed of a layer comprising the heat-fusion composition according to the first embodiment and a layer comprising a composition prepared by blending (d) 0.01 to 25 parts by weight of a polyfunctional compound containing at least two functional groups reactive to the epoxy group in a molecule, for example a polyfunctional compound containing at least two different or identical functional groups selected from an amino group, a carboxylic anhydride group, a phenolic hydroxide group, a hydroxyl group and a carboxyl group in a molecule, and/or (e) 0.001 to 2 parts by weight of an accelerating agent for the curing reaction of epoxy groups per 100 parts by weight of the hard resin of the other layer.

BEST MODE FOR CARRYING OUT THE INVENTION

The present invention will now be described in more detail hereinafter. The heat-fusion composition according to the present invention is characterized by containing a block copolymer (a) having epoxy groups. The heat-fusion composition according to the present invention also comprises a block copolymer (a) having epoxy groups and a thermoplastic elastomer. The heat-fusion composition according to the present invention further comprises a block copolymer (a) having epoxy groups, for example, an epoxydized block copolymer obtained by epoxydizing a block copolymer comprising a polymer block mainly composed of a vinyl aromatic hydrocarbon compound and a polymer block mainly composed of a conjugated diene compound or a hydrogenation product of the foregoing polymer block, and a thermoplastic elastomer (b), for example at least one kind of elastomer selected from styrene elastomers, polyurethane elastomers, polyester elastomers, polyamide elastomers, polyolefin elastomers and polyvinyl chloride elastomers.

The heat-fusion composition according to the present invention has a good heat-fusion property with a hard resin, forming the multi-layer molded body composed of a layer comprising the heat-fusion composition and a layer comprising the hard resin into a strongly heat-adhered molded body with each other.

Vinyl aromatic compounds as one component of the polymer block constituting the block copolymer (a) having epoxy groups can be selected, for example, from at least one of the compounds comprising styrene, a-methylstyrene, vinyltoluene, p-tert-butylstyrene, divinylbenzene, p-methylstyrene and 1,1-diphenylstyrene. Styreneis preferable among them.

Conjugated diene compounds as components of the other polymer block constituting the block copolymer (a) can be selected, for example, from at least one of the compounds comprising butadiene, isoprene, 1,3-pentadiene, 2,3-dimethyl-1,3-butadiene, 3-butyl-1,3-octadiene and phenyl-1,3-butadiene. Butadiene and isoprene, and a combination thereof are preferable among them. The block copolymer as used herein refers to a block copolymer comprising a polymer block A mainly composed of a vinyl aromatic compound and a polymer block B mainly composed of a conjugated diene compound. A weight ratio of copolymerization between the vinyl aromatic compound and conjugated diene compound is in the range of 5/95 to 70/30, the range of 10/90 to 60/40 being preferable.

The number average molecular weight of the block copolymer to be used in the present invention is in the range of 5,000 to 600,000, preferably in the range of 10,000 to 500,000, and the molecular weight distribution (the ratio (Mw/Mn) between the weight average molecular weight (Mw) and number average molecular weight (Mn)) is 10 or less. The block copolymer may have a linear, branched or radial molecular structure, or a combination thereof. For example, the block copolymer is represented by a block copolymer of a vinyl aromatic compound and conjugated diene compound having a structure such as A-B-A, B-A-B-A, (A-B-)$_4$ Si or A-B-A-B-A. The unsaturated bonds in the conjugated diene of the block copolymer may be partially hydrogenated.

Any production methods can be adopted as the methods for producing the block copolymer to be used in the present invention, provided that the copolymer obtained has the structure as described above. For example, a block copolymer of a vinyl aromatic compound and conjugated diene compound can be synthesized in an inert solvent using a lithium catalyst or the like in accordance with the methods disclosed in Japanese Examined Patent Publications No. 40-23798, No. 47-3252, No. 48-2423, No. 46-32415, No. 49-36957, No. 43-17979and No 56-28925, Japanese Patent Application No. 49-105970 and No. 50-27094, and Japanese Unexamined Patent Publication No. 59-166518. According to the method disclosed in Japanese Examined Patent Publications No. 42-8704 and No. 43-6636, or in Japanese Unexamined Patent Publication No. 59-133203, the partially hydrogenated block copolymers to be used in the present invention can be synthesized by a hydrogenation in an inert solvent in the presence of a hydrogenation catalyst. The epoxydized block copolymers to be used in the present invention are obtained by epoxydizing the foregoing block copolymers in the present invention.

The epoxydized block copolymer (otherwise, referred to a epoxy-modified block copolymer) in the present invention can be obtained by allowing the foregoing block copolymer to react with an epoxydizing agent such as hydroperoxides or peroxy acids in an inert solvent. Examples of the peroxy acids include performic acid, peracetic acid or perbenzoic acid, a catalytic effect being able to obtain by using either one of these peroxy acids or a mixture thereof together with hydrogen peroxide, or by using an organic acid together with hydrogen peroxide, or by using molybdenum hexacarbonyl together with tert-butyl hydroperoxide. The optimum amount of the epoxydizing agent can be determined depending on variables such as the kind of respective epoxydizing agent to be used, the required degree of epoxydation and the kind of respective block copolymer to be used.

The epoxydized block copolymer obtained can be isolated by an appropriate method, for example by precipitating in a poor solvent, by evaporating the solvent off after introducing the polymer into hot water with stirring, or by directly removing the solvent.

The degree of epoxydation is determined, after titrating with 0.1 N hydrobromic acid, by the following equation:

$$\text{Epoxy equivalent} = (10.000 \times W)/(V \times f)$$

wherein W, V and f denote the weight (g) of the epoxydized block copolymer, the titration volume with hydrobromic acid and the factor of the hydrobromic acid solution, respectively. The smaller the calculated value is, the higher the degree of epoxydation.

The epoxy equivalent of the epoxydized block copolymer according to the present invention is 140 to 10,000, the equivalent of 200 to 6,000 being especially preferable. It is not preferable that the degree of epoxydation is too high since a gelation product is formed during processing of the heat-fusion composition obtained to result in a poor appearance while, when the degree of epoxydation is too low, heat-fusion of the composition ascribed to epoxy groups can not be expected.

The thermoplastic elastomer to be used in the constituent (b) of the heat-fusion composition will be described hereinafter. Known styrene elastomers such as styrene-butadiene block polymers (abbreviated as SBS) styrene-isoprene block polymers (abbreviated as SIS), hydrogenated SBS block polymers (abbreviated as SEBS), hydrogenated SIS block polymers (abbreviated as SEPS) and styrene-olefin block polymers (abbreviated as SEBC) may be used for the styrene elastomers.

Examples of the polyurethane elastomers as a constituent (b) known in the art are obtained by allowing a diol polymer (for example, polyether based diols such as polyalkylene glycol and polyester based diols such as polycaprolactone) with a molecular weight of 500 to 5,000 having an active hydrogen at its terminal to react with a low molecular weight glycol (such as ethyleneglycol) having a molecular weight of 500 or less or with a diisocyanate (such as phenylenediisocyanate).

An example of the polyester elastomers is a block copolymer having a crystalline aromatic polyester (such as polybutylene terephthalate) as a hard segment and an aliphatic polyether (such as polytetramethylene glycol) or an aliphatic polyester (such as polycaprolactone) as a soft segment.

An example of the polyamide elastomers is a block copolymer containing a crystalline aliphatic polyamide (such as nylon 6, 11 or 12) as a hard segment and a polyoxyalkylene ether (such as polyethylene glycol, polypropylene glycol or polytetramethylene glycol) or an aliphatic polyester (such as polycaprolactone), both being amorphous and having a low glass transition point, as a soft segment. The polyamide elastomers are classified into two categories of polyether ester block amides and polyether block amides.

A polyolefin such as polyethylene or polypropylene as a hard segment is blended with an ethylene-propylene rubber as a soft segment in the polyolefin elastomer. The method for producing the same includes a simple blending method, a dynamic cross-linking method of the soft segment, and a method for producing the same in a polymerization reaction vessel. polyolefin copolymers are included in the polyolefin elastomers; for example polyolefin copolymers known in the art such as chlorinated polyethylene containing 20 to 40% by weight of chlorine, ethylene-ethylacrylate containing 10 to 40% by weight of ethyl acrylate, ethylene-methyl methacrylate containing 10 to 40% by weight of methyl methacrylate, carbon monoxide containing ethylene-n-butyl acrylate copolymer containing 5 to 20% by weight of carbon monoxide and 20 to 50% by weight of n-butyl acrylate, ethylene based ionic cross-link resin known as ionomers or ethylene-vinyl acetate copolymer containing 10 to 40% by weight of vinyl acetate.

Polyvinyl chloride elastomers include a high molecular weight polymer having a degree of polymerization of 2,000 or more in which molecular chains are made to highly interlocked with each other, or an elastomer known in the art having a cross-linked structure or branched structure owing to polyfunctional monomers. Polyvinyl chloride elastomers being made soft with a plasticizer or having a nitrile-butadinene rubber as a soft segment is also included in this category.

It is preferable that the blending ratio of the epoxydized block copolymer (a) and the thermoplastic elastomer (b) as constituents of the heat-fusion composition according to the present invention are both in the ranges of 20 to 80% by weight (the combined content of (a) and (b) being 100% by weight).

The other embodiment of the present invention includes a heat-fusion composition prepared by blending 10 to 50 parts by weight, preferably 20 to 40 parts by weight, of the hard resin (c) to 100 parts by weight of the heat-fusion composition. Blending the hard resin (c) allows the surface hardness of the heat-fusion composition to be increased, if necessary. When the content of the hard resin (c) is less than 10 parts by weight, there is no effect for improving the surface hardness while, when the value is more than 50 parts by weight, the surface hardness becomes too high while decreasing the heat-fusion property.

Commonly used hard resins as well as an alloy or blend thereof are available for the hard resin as a constituent (c). Engineering plastics known in the art, such as polyphenylene ether, polyacetal, polyallylate, liquid crystal polymer, polysulfone, polyethersulfone and polyphenylene sulfide, may be used. Heat curing resins such as epoxy resins, diallylphthalate resins, phenol resins, melamine resins, urea resins and unsaturated polyester resins can be also used, provided that the resins are limited to those being molded into a multi-layer molded body by an insert injection molding as will be described hereinafter. However, at least one kind of the thermoplastic resin selected from an ABS resin, impact resistant polystyrene, polycarbonate, polymethylmethacrylate, polypropylene, saturated polyester resin, polyamide, polyvinyl chloride and polyphenylene oxide resin is especially preferable.

The well known ABS resin to be used in the present invention includes styrene-acrylonitrile copolymers modified with a variety of rubbers such as butadiene rubber, styrene-butadiene copolymer, ethylene-propylene copolymer and ethylene-propylene-diene copolymer. Although ABS resins are usually produced by emulsion polymerization or continuous bulk polymerization, the ABS resin whose rubber concentration is adjusted with a styrene-acryronitrile copolymer is also an well known ABS resin that may be included in the present invention.

Examples of the impact resistant polystyrene are the highly impact resistant polystyrene modified with a variety of rubbers such as butadiene rubber, styrene-butadiene copolymer, ethylene-propylene copolymer and ethylene-propylene-diene copolymer.

Though carbonate resins include 4,4-dihydroxydiphenyl-2,2-propane (common name: bisphenol A) as well as 4,4'-dihydroxyallylalkane polycarbonate, a polycarbonate of 4,4'-dihydroxydiphenyl-2,2-propane with a number average molecular weight of 15,000 to 80,000 is especially preferable among them. These polycarbonate resins can be produced by any methods. Examples of the method for producing a polycarbonate using 4,4'-dihydroxydiphenyl-2,2-propane as a starting material includes a method in which phosgene gas is blown into 4,4'-dihydroxydiphenyl-2,2-propane in the presence of an alkaline aqueous solution and a solvent, or an ester exchange method of 4,4'-dihydroxydiphenyl-2,2-propane carbonate diester in the presence of a catalyst.

Examples of polymethylmethacrylate include methyl methacrylate polymer, a copolymer of methyl methacrylate with a small amount of methyl acrylate or butyl acrylate and a copolymer of 20 to 80% by weight of methyl methacrylate with 20 to 80% by weight of styrene.

Polypropylene means a crystalline polypropylene, including, other than a polymer of propylene alone, block or random copolymers in which propylene is co-polymerized with, for example, a-olefin such as ethylene and butene-1.

The saturated polyester resin is composed of a dicarboxylic acid component at least 40 mole % of which is terephthalic acid, and a diol component. The dicarboxylic acid components other than terephthalic acid described above include aliphatic dicarboxylic acids with a carbon number of 2 to 20 such as adipic acid, sebacic acid and dodecane dicarboxylic acid, aromatic dicarboxylic acids such as isophthalic acid and naphthalene dicarboxylic acid, or alicyclic dicarboxylic acids such as cyclohexane dicarboxylic acid, being used alone or as a mixture thereof. The diol components described above include aliphatic glycols such as ethyleneglycol, 1,3-propanediol, 1,4-butanediol, 1,6-hexanediol, 1,10-decanediol and 1,4-cyclohexanediol, or alicyclic diols, being used alone or as a mixture thereof. The especially desirable effect of the present invention can be displayed when the resin is polybutylene terephthalate or polyethylene terephthalate. The resin should preferably have a intrinsic viscosity in the range of 0.5 to 3.0 dl/g as measured in a solvent of o-chlorophenol at 25° C., obtaining a high mechanical strength when a polyester resin with a viscosity of this range is used.

The polyamides used in the present invention include aliphatic polyamide resins such as nylon 6, nylon 6.6, nylon 6.10, nylon 6.12, nylon 11, nylon 12 and nylon 4.6, or aromatic polyamide resins such as polyhexamethylenediamine terephthalamide, polyhexamethylenediamine isophthalamide and xylene containing polyamide, and a modified compound or a mixture thereof. The especially preferable polyamide resin is nylon 6 or nylon 6.6.

Polyvinyl chloride to be used in the present invention is a polymer known in the art with a degree of polymerization of 700 to 1,600 in which additives such as an impact resistance improving agent, plasticizer, heat stabilizing agent and lubricant may be included.

A polyphenylene ether resin is a polymer obtained by an oxidative polymerization of phenolic compounds with oxygen or oxygen containing gas using a coupling catalyst. Examples of them include phenol, o-, m- or p-cresol, 2,6-, 2,5-, 2,4- or 3,5-dimethylphenol, 2-methyl-6-phenylphenol, 2,6-diphenylphenol, 2-methyl-6-ethylphenol, and 2,3,5-, 2,3,6- and 2,4,6-trimethylphenol. Two or more kinds of these phenolic compounds may be used. While the polyphenylene ether resin is used by being modified with styrene resins (such as the foregoing highly impact resistant polystyrene) as known in the art, these modified polyphenylene ether resins are also included in the present invention.

According to the other embodiment of the present invention, a heat-fusion composition having much higher heat-fusion property ascribed to a reaction with epoxy groups contained in the epoxydized block copolymer (a) can be obtained by allowing 0.01 to 25 parts by weight of a polyfunctional compound (d), containing at least two functional groups reactive to epoxy groups in the molecule, to be contained in 100 parts by weight of the heat-fusion composition containing the block copolymer (a) having epoxy groups or in 100 parts by weight of the heat-fusion composition comprising (a) and thermoplastic elastomer (b). At least two functional groups contained in this polyfunctional compound (d) may be the same or different with each other. The molecular weight of the polyfunctional compound (d) is not specifically limited but a polymer compound having a weight average molecular weight of about 1,000,000 to 2,000,000 is typically included in the present invention. Although the blending ratio of the polyfunctional compound (d) should be adjusted depending on the reactivity to epoxy groups in the present invention, the ratio is 0.01 to 25 parts by weight, preferably in the range of 0.1 to 20 parts by weight, per 100 parts by weight of the heat-fusion composition to be molded into a multi-layers. It is not preferable that the blending ratio of the polyfunctional compound (d) is either less than 0.01 parts by weight or more than 25, since the effect of improvement of the heat-fusion property is not sufficiently displayed in the former case while an excessive epoxydation reaction will take place to induce gelation in the latter case.

According to the different embodiment of the present invention, 0.001 to 2 parts by weight of the accelerating agent (e) for the curing reaction of epoxy groups may be contained instead of 0.01 to 25 parts by weight of the component (d), or 0.001 to 2 parts by weight of the component (e) may be contained together with 0.01 to 25 parts by weight of the component (d) in the heat-fusion composition comprising the components (a) and (d) or in the heat-fusion composition comprising (a), (b) and (d) as described above. The amount of addition of the accelerating agent (e) for the curing reaction of epoxy groups is 0.001 to 2 parts by weight and more preferably 0.01 to 1 parts by weight, the amount of 0.01 to 0.5 parts by weight being especially preferable. The amount of more than 2 parts by weight is not preferable since the curing reaction of epoxy groups excessively proceeds to result in a gel formation.

According to the different embodiment of the present invention, the heat-fusion composition having a higher heat-fusion property can be obtained owing to a reaction with epoxy groups contained in the epoxydized block copolymer (a) by allowing 10 to 50 parts by weight of the component (c) and 0.01 to 25 parts by weight of the polyfunctional compound (d) containing at least two functional groups reactive to epoxy groups to be contained in 100 parts by weight of the heat-fusion composition containing the component (a) or in 100 parts by weight of the heat-fusion composition comprising the components (a) and (b). At least two functional groups contained in this polyfunctional compound (d) may be the same or different with each other. The molecular weight of the polyfunctional compound (d) is not specifically limited but a polymer compound with a weight average molecular weight of about 1,000,000 to 2,000,000 may be included in the present invention. Although the blending ratio of the polyfunctional compound (d) should be adjusted depending on the reactivity to epoxy groups, the content is 0.01 to 25 parts by weight per 100 parts by weight of the heat-fusion composition for molding into a multi-layers, the range of 0.1 to 20 parts by weight being especially preferable.

It is not preferable that the blending ratio of the polyfunctional compound (d) is either less than 0.01 parts by weight or more than 25 parts by weight, since the effect of improvement of the heat-fusion property is not sufficiently displayed in the former case while an excessive epoxydation reaction will take place to induce gelation in the latter case.

According to the different embodiment of the present invention, 0.001 to 2 parts by weight of the accelerating agent (e) for the curing reaction of epoxy groups may be contained instead of 0.01 to 25 parts by weight of the component (d), or 0.001 to 2 parts by weight of the component (e) may be contained together with 0.01 to 25 parts by weight of the component (d) in the heat-fusion composition comprising the components (a) and (c), or the components (a), (b) and (c). By the same reasons as hitherto described, the amount of addition of this accelerating agent (e) for the curing reaction of epoxy groups is 0.001 to 2 parts by weight, more preferably 0.01 to 1 parts by weight and especially 0.01 to 0.5 parts by weight.

The polyfunctional compound (d) will be described hereinafter. The polyfunctional compound (d) is a compound containing at least two functional groups reactive to epoxy groups in the molecule, a compound containing at least two functional groups reactive to epoxy groups selected from an amino group, a carboxylic acid anhydride group, a phenolic hydroxyl group, a carboxyl group and a hydroxyl group being preferable.

Examples of the compound containing two or more of amino groups in the molecule are: aliphatic diamines such as 1,6-hexamethylene diamine, trimethylhexamethylene diamine, 1,4-diaminobutane, 1,3-diaminopropane, ethylenediamine and polyether diamine; aliphatic diaminecarbamates such as hexamethylenediamine carbamate and ethylenediamine carbamate; aliphatic polyamines such as diethylenetriamine, triethylenetetramine, tetraethylenepentamine, pentaethylene-hexamine, ethylaminoethylamine, methylaminopropylamine, 2-hydroxyethylaminopropylamine, aminoethylethanolamine, 1,3-bis(3-aminopropoxy)-2,2-dimethypropane, 1,3,6-trisaminomethylhexane, iminobispropylamine, methyliminobispropylamine and bis (hexamethylene) triamine; alicyclic amines such as menthenediamine, N-aminoethylpyperazine, 1,3-diaminocyclohexane, isophoronediamine and bis(4-amino-3-methylcyclohexyl)methane; aliphatic polyamines having an aromatic ring such as m-xylylenediamnie and tetrachloro-p-xylylenediamine; aromatic amines such as m-phenylenediamine, diaminodiphenylether, 4,4-methylenedianiline, diamino-diphenylsulfone, benzidine, 4,4'-bis (o-toluidine), 4,4'-thiodianiline, o-phenylenediamine, dianisidine, methylenebis(o-chloroaniline), 2,4-toluenediamine, bis (3,4-diaminophenyl) sulfone, diaminoditolylsulfone, 4-chloro-o-phenylenediamine, 4-methoxy-6-methyl-m-phenylenediamine and m-aminobenzylamine; and polyamines containing silicon such as 1,3-bis(γ-aminopropyl)-1,1,3,3-tetramethyldisiloxane. Examples of the other amines available are silicone oil modified with amines; butadiene-acrylonitrile copolymers whose terminal functional group is an amine; tertiary amine compounds such as N,N,N',N'-tetramethylhexamethylenediamine and N,N,N',N",N"-pentamethyldiethylenetriamine; ethylene copolymers comprising an ethylene unit of a copolymer of ethylene and N, N-dimethylaminoethylmethacrylate and α,β-unsaturated carboxylic acid N,N-dialkylaminoalkyl ester unit; ethylene copolymers comprising an ethylene unit of the copolymer of ethylene and N,N-dimethylaminopropylacrylamide and N,N-dialkylaminoalkyl-α,β-unsaturated carboxylic acid amide unit; dihydrazide compounds such as succinic acid dihydrazide, adipic acid dihydrazide, isophthalic acid dihydrazide and eicosane dicarbocylic acid dihydrazide; diaminomaleonitrile; and solamine.

Examples of the polyfunctional compounds containing two or more of carboxylic acid anhydride groups in a molecule include ethylene copolymers comprising ethylene units and maleic anhydride units, copolymers of isobutylene and maleic anhydride, and copolymers of styrene and maleic anhydride. These copolymers may further contain α,β-unsaturated carboxylic acid alkyl esters or carboxylic acid vinyl esters—for example alkyl esters of acrylic acid and methacrylic acid such as methyl acrylate, ethyl acrylate, butyl acrylate, methyl methacrylate, ethyl methacrylate and butyl methacrylate, and vinyl acetate and vinyl propionate— as components of the copolymer. Trimellitic acid anhydride, pyromellitic acid anhydride and ethyleneglycol-bis (anhydrotrimellitate) are also included in the examples.

Examples of the polyfunctional compounds having two or more of phenolic hydroxyl groups in a molecule include catechol, resorcin, hydroquinone, Novolac phenol resin, bisphenol A and urethane prepolymers having phenolic hydroxyl groups at both ends.

Examples of the polyfunctional compounds having two or more of hydroxyl groups in a molecule include saponification products of copolymers of ethylene and vinyl acetate, poly (oxytetramethylene) glycol poly (oxypropylene) glycol, poly (ethyleneadipate) glycol, polyethyleneglycol and polyvinyl alcohol.

Examples of the polyfunctional compounds having two or more of carboxyl groups in a molecule include aliphatic polyfunctional carboxylic acids such as oxalic acid, succinic acid, adipic acid, azelaic acid, sebasic acid, dodecanedicarboxylic acid, carbalic acid, cyclohexane-dicarboxylic acid, cyclopentanedicarboxylic acid, ethylene-acrylic acid copolymer, ethylene-methacrylic acid copolymer, ethylene-acrylic acid-methyl acrylate copolymer, ethylene-acrylic acid-ethyl acrylate copolymer, ethylene-acrylic acid-butyl acrylate copolymner, ethylene-acrylic acid-vinyl acetate copolymer, ethylene-methacrylic acid-methyl methacrylate copolymer, ethylene-methacrylic acid-ethyl methacrylate copolymer, ethylene-methacrylic acid-butyl methacrylate copolymer and ethylene-methacrylic acid-vinyl acetate copolymer; and aromatic polyfunctional carboxylic acids such as terephthalic acid, isophthalic acid, orthophthalic acid, naphthalenedicarboxylic acid, biphenyldicarboxylic acid, trimesic acid and trimellitic acid, especially aliphatic polyfunctional carboxylic acids being preferably used.

Compounds having a plurality of different functional groups including one or more of carboxyl group, and one or more of functional groups selected from amino group, carboxylic acid anhydride group, phenolic hydroxyl group and hydroxyl group are included in the polyfunctional compounds. Examples of them are 4-aminobutyric acid, 6-aminohaxanoic acid, 12-aminododecanoic acid, 4-hydroxybutyric acid, 6-hydroxyhexanoic acid, 12-hydroxydodecanoic acid, 5-hydroxy-barbituric acid, 5-aminobarbituric acid, 5-hydroxyimino-barbituric acid and tris (dimethylaminomethyl) phenol. Examples of the polyfunctional compounds having one or more of phenolic hydroxyl groups and amino groups are o-aminophenol and m-aminophenol. There is no problem that the foregoing polyfunctional compounds are used together.

The component (e) will be described hereinafter.

While conventional reaction accelerating agents are available as the accelerating agent for the curing reaction of epoxy groups, at least one of the compound selected from tertiary amines, quaternary amine salts, imidazoles, phosphonium salts and organic metal complexes are especially preferable.

The tertiary amines include trialkylamines such as triethylamine, tributylamine, trihexylamine and triamylamine; alkanol amines such as triethanol amine and dimethylamino-ethanol; aliphatic or non-aromatic cyclic amines such as triethylenediamine; aromatic amines such as dimethylphenyl-amine, dimethylbenzylamine, 2-(dimethylaminomethyl)phenol, 2,4,6-tris (dimethylaminomethyl)phenol, dimethylaniline; alicyclic amines such as pyridine, picoline and 1,8-diazabicyclo (5.4.0)undecene-1; and salts of these tertiary amines with organic acids or inorganic acids.

Examples of the quaternary amine salts are tetraalkylammonium halide (for example tetra-(C1 to 6)-alkylammonium halides such as tetramethylammonium chloride, tetraethyl-ammonium chloride, and tetrabutylammonium bromide), trialkylaralkylammonium halide (for example tri-(C1 to 6)-alkyl-(C7 to 10)-alalkylammonium halide such as trimethylbenzyl-ammonium chloride, triethylbenzylammonium chloride and tripropylbenzylammonium chloride) and N-alkylpyridinium halide (for example N-methylpyridinium chloride).

Examples of imidazoles are 2-(C1 to 18)-alkylimidazoles such as 2-methylimidazole, 2-ethylimidazole and 2-isopropylimidazole; 2-arylimidazoles such as 2-phenylimidazole; imidazole compounds having alkyl groups or aryl groups at 2- and/or 4-position such as 2-ethyl-4-methylimidazole and 4-phenyl-2-methylimidazole; imidazole compounds such as cyanoethylated imidazole and cyanoethylated imidazole compounds converted into triazine; and salts of these imidazole compounds (for example trimellitic acid salts or isocyanuric acid salts).

Phosphonium salts include tetraalkylphosphonium halides (for example tetra-(C1 to 6) alkylphosphonium halides such as tetramethylphosphonium bromide and tetrabutylphosphonium bromide), tetrabutylphosphonium benzotriazalate, tetraarylphosphonium halide (for example tetraphenyl-phosphonium bromide), ethyltriphenylphosphonium bromide and triphenylbenzylphosphonium bromide.

Examples of the organic metal complexes are tin compounds (for example dibutyl tin dilaurate) and titanium compounds (for example triisopropoxymethyl titanate).

Of these accelerating agents (e) for the curing reaction of epoxy groups, tertiary amines such as dimethylphenylamine, quaternary amines such as triethylbenzylammonium chloride, phosphonium salts such as tetrabutylphosphonium bromide and tetraphenylphosphonium bromide, and tin compounds such as dibutyl tin dilaurate are preferably used in the present invention.

The multi-layer molded body comprising the foregoing heat-fusion composition and the other layer will be described hereinafter.

The layer comprising the heat-fusion composition according to the present invention has a good adhesive property with the other layer.

Examples of the other layer are paper, cloths, metals, woods, heat-curing reins, thermoplastic resins and elastomers. The multi-layer molded body according to the present invention preferably contains heat-curing resins or thermoplastic resins as the other layer. The layer has an excellent heat-fusion property with the layer comprising at least one kind of resin selected from hard resins such as ABS resin, impact resistant polystyrene, polycarbonate, polymethylmethacrylate, polypropylene, saturated polyester resins, polyamide, polyvinyl chloride and polyphenylene oxide resin. The hard resin as used herein may be the same or different hard resin as used in the constituting component of the heat-fusion composition according to the present invention.

The heat-fusion property of the multi-layer molded body according to the present invention is more enhanced to obtain a more robust multi-layer molded body owing to a reaction with epoxy groups in the heat-fusion composition containing the epoxydized block copolymer (a), by allowing 0.01 to 25 parts by weight of the foregoing polyfunctional compound (d) containing at least two functional groups, selected from amino group, carboxylic acid anhydride group, phenolic hydroxyl group, carboxyl group and hydroxyl group, reactive to epoxy groups to contain in 100 parts by weight of the hard resin as a layer comprising the hard resin.

A layer formed by allowing 0.01 to 25 parts by weight of the foregoing polyfunctional compound (d) containing at least two functional groups, selected from amino group, carboxylic acid anhydride group, phenolic hydroxyl group, carboxyl group and hydroxyl group, reactive to epoxy groups, and/or 0.001 to 2 parts by weight of the foregoing accelerating agent (e) for the curing reaction of epoxy groups to contain in 100 parts by weight of the hard resin may be used as a layer comprising the hard resin in the multi-layer molded body according to the present invention. A higher heat-fusion property can be obtained by accelerating the reaction of epoxy groups in the heat-fusion composition.

A method for kneading fused resins with a biaxial extruder is used for the method for producing the heat-fusion composition according to the present invention. The epoxydized block copolymer as the component (a), the elastomer as the component (b), and the hard resin (c) and/or the accelerating agent (e) for the curing reaction of epoxy groups and/or the polyfunctional compound (d), if necessary, may be fused and kneaded together. After feeding the components (a) and (b) into the biaxial extruder at first to be fused and kneaded, (c) and/or (d) and/or (e) maybe fed to be fused and kneaded in the next step.

When a hard resin composition is obtained by kneading the polyfunctional compound (d) and/or accelerating agent (e) for the curing reaction of epoxy groups with the hard resin, the polyfunctional compound (d) and/or accelerating agent (e) for the curing reaction of epoxy groups may be fused and kneaded together with the hard resin as in the usual method for producing the heat-fusion composition. Otherwise, the component (e) may be fed to fuse and knead in the second step after firstly feeding the hard resin and the component (d) to the biaxial extruder for fusion and kneading.

Kneading machines such as conventionally used uniaxial or biaxial extruders, a banbury mixer, rolls and various kind of kneaders can be used for fusion-kneading.

Additives such as pigments, dyes, reinforcers, inorganic fillers, heat stabilizers, anti-oxidants, anti-weathering agents, core materials, lubricants, anti-static agents, flame retardants, plasticizers, foaming agents and oils, or other polymers may be added and blended with the hard resin constituting the heat-fusion composition according to the present invention or the multi-layer molded body comprising the same, provided that the additives do not compromise the molding ability and physical properties of the composition. Among these additives other than essential components, an oil is known to be a useful additive for adjusting the molding ability, softness and surface hardness. The oils available in the present invention are the oils classified into paraffin and naphthene oils. Examples of the available inorganic fillers are calcium carbonate, silica, talk, clay, titanium oxide, carbon black, barium sulfate, zinc oxide, magnesium hydroxide, mica, glass flakes, glass fiber, glass beads, glass balloon, stainless steel fiber and alumina.

An injection molding machine, extruder, blow molding machine or a combined molding machine thereof is used for molding the heat-fusion composition and hard resin according to the present invention into a multi-layers. A method for using a double (or two color) molding machine and an insert molding method are used in molding different materials into a multi-layers using an injection molding machine. In the method using the double injection molding machine, a die for the primary material (a hard resin) and a die for the secondary material (a heat-fusion composition) are disposed to alternately extrude the different resins from the two heated cylinders. A die for the double molding is classified into core-rotation method and core-back method. In the core-rotation method, only the movable part of the primary material die is rotated by 180° C. to make the primary molded body molded at first to transfer to the cavity part of the secondary material die to be used in the subsequent injection and, after forming a space for filling the secondary material following die clamping, the secondary material is filled into the space to subject to heat-fusion, thereby obtaining a multi-layer molded body. In the core-back method, on the other hand, a slide core is assembled in the die to firstly inject the primary material by allowing the core to advance and, after allowing the core to recede, the secondary material is injected into the cavity formed to subject to heat-fusion, thereby obtaining a multi-layer molded body. A combined method of these two methods has been developed, or a method for simultaneously obtaining the multi-layer molded body from the two cylinders are being developed. The multi-layer molded body according to the present invention may be produced by the method using the double molding machine, irrespective of the methods.

In the method by the insert molding, the primary material is previously molded, which is inserted into the die followed by injecting the secondary material to make the first and second materials to heat-fuse to obtain a multi-layer molded body. Although this method is favored in its low die cost, the degree of molecular interlock between the primary and secondary materials is low since the surface of the primary material has been already hardened, exhibiting a low heat-fusion property. While a multi-layer molded body having a high heat-fusion property is expected by using the method described above, this insert molding method is made possible to obtain a multi-layer molded body having a high heat-fusion property in the present invention.

Conventional multi-layer extrusion molding machine is used in the method for molding different materials into a multi-layers using an extrusion molding machine. The method for molding different materials into a multi-layer using a blow molding machine is classified into two methods of multi-layer extrusion blow molding in which parisons are formed by co-extrusion and multi-layer injection blow molding in which parisons are formed by co-injection. The method for using the conventional multi-layer extrusion blow molding machine can be used for the multi-layer molded body according to the present invention irrespective of the methods.

EXAMPLE

While the present invention will be described hereinafter in more detail referring to the examples, the present invention is not limited thereto in any sense. (Method of measurement)

The physical properties in the examples were measured as follows.

Heat fusion property (1): A plate with a dimension of 60 mm in length, 25 mm in width and 2 mm in thickness was molded using a hard resin constructing the multi-layer molded body according to the present invention with a injection molding machine. This plate was inserted into a die to mold a heat-fusion composition according to the present invention on this plate by injection, thereby producing a test piece with a dimension of 127 mm in length, 25 mm in width and 8 mm in thickness. The surface temperature of the inserted plate was 20° C. The heat-fusion strength was measured by a tensile test such that one end of the heat fusion composition of the test piece was bent at an angle of 90° against one end of the same side of the hard resin of the test piece. The tension speed was 5 nun/min. In other word, the test piece was subjected to a 90° mold release strength measurement with a width of 25 mm. The unit of the heat-fusion property is in kg/25 mm.

Heat-fusion property (2): A plate with an width of 100 mm and thickness of 8 mm was continuously extruded with a dual-layer extruder having two cylinders. The thickness of the hard resin layer is 2 mm while the thickness of the heat-fusion composition is 6 mm. This plate was cut off to prepare a test piece having a thickness of 25 mm and the heat-fusion strength was measured by a tensile test such that one end of the heat fusion composition of the test piece was bent at an angle of 90 against one end of the same side of the hard resin of the test piece. The tension speed was 5 mm/min. The unit of the heat-fusion property is in kg/25 mm as described above.

Surface hardness: The hardness was measured with a hardness meter according to JIS K-6301 type A.

Mold release property: Mold release property from the injection molding die or touch roll of the extrusion molding was visually observed. The property was evaluated by a mark (x) (some problem in mold release) or (o) (no problem in mold release).

Gel: The appearance of the heat-fusion composition layer was visually observed with respect to roughness due to gel formation, wherein the mark (x) denotes that the surface lost glossiness due to roughness by gel formation and the mark (o) denotes that there was no roughness.

Reference Example 1

Method for producing epoxydized block copolymer (a-1)

In a reaction vessel equipped with a jacket and provided with a stirrer, reflux condenser and thermometer, 400 g of a hydrogenated styrene-butadiene block copolymer (made by Asahi Kasei Co., Taftec H-1041) and 1,500 g of cyclohexane were placed and the mixture was subjected to an epoxydation reaction at 50° C. for 3 hours with stirring while continuously adding 39 g of 30 wt % peracetic acid solution in ethyl acetate dropwise. The reaction solution was taken out of the reaction vessel after cooling the solution at room temperature and, after washing the reaction solution with water, the solvent was removed by a steam stripping to obtain an epoxydized block copolymer. This epoxydized block copolymer obtained is referred to a copolymer (a-1). The epoxy equivalent of this copolymer is 5,340.

Reference Example 2

Method for producing epoxydized block copolymer (a-2)

In a reaction vessel equipped with a jacket and provided with a stirrer and thermometer, 300 g of a polystyrene-polybutadiene-polystyrene block copolymer (made by Nihon Synthetic Rubber Co., trade name: TR2000) was dissolved in 3,000 g of cyclohexane. A hydrogenation catalysts—a mixture prepared by mixing 40 ml of a cyclohexane solution of di-p-tolylbis (1-cyclopentadienyl) titanium (with a concentration of 1 millimole/litter) and 8 ml of n-butyllithium solution (with a concentration of 5 millimole/litter) at 0° C. under a hydrogen pressure of 2.0 kg/cm²— was added to the foregoing solution to allow the mixture to react at 60° C. under a hydrogen pressure of 2.5 kg/cm² for 30 minutes. The solvent was removed from the partially hydrogenated polymer solution by vacuum drying (the degree of hydrogenation of the total butadiene portion was 30%). Dissolved was 300 g of this partially hydrogenated polymer in 1,500 g of cyclohexane. Then, an epoxydation reaction was carried out by continuously adding 300 g of 30 wt % peracetic acid solution in ethyl acetate dropwise with stirring at 40° C. for 3 hours. The reaction solution was taken out of the reaction vessel after cooling the solution at room temperature and the polymer was precipitated by adding a large amount of methanol in the reaction solution. An epoxydized block copolymer was obtained by filtrating the precipitate off followed by washing with water and drying. The epoxydized block copolymer obtained is referred to the copolymer (a-2). The epoxy equivalent of this polymer is 275.

Reference Example 3

Method for producing epoxydized block copolymer (a-3)

In a reaction vessel equipped with a jacket and provided with a stirrer, reflux condenser and thermometer, 300 g of a polystyrene-polybutadiene-polystyrene block copolymer (made by Nihon Synthetic Rubber Co., trade name: TR2000) was dissolved in 1,500 g of ethyl acetate. An epoxydation reaction was carried out by continuously adding 169 g of 30 wt % peracetic acid solution in ethyl acetate dropwise at 40° C. for 3 hours with stirring. The reaction solution was taken out of the reaction vessel after cooling the solution at room temperature and the polymer was precipitated by adding a large amount of methanol. The precipitate was filtered, washed with water and dried to obtain a epoxydized polymer (a-3). The epoxy equivalent of the epoxydized block copolymer obtained was 470.

The constituting components used in the present invention are as follows:

a-1: a hydrogenated epoxydized block copolymer with an epoxy equivalent of 5,340;
a-2: an epoxydized block copolymer with an epoxy equivalent of 275;
a-3: an epoxydized block copolymer with an epoxy equivalent of 470;
b-1: "Septon 2002" made by Kurarey Co., a hydrogenated styrene-isoprene block copolymer (SEPS);
b-2: "Lezamine P4038" made by Dainihon Seika Kogyo Co., a caprolactone-polyurethane based elastomer;
b-3: "Neubelane P4110AN" made by Teijin Co., a PBT-ether based polyester elastomer;
b-4: "Pebacks 4033S" made by At-Chem Co., a nylon based elastomer;
b-5: "Santplane 201-73" made by AES Japan Co., a polyolefin based elastomer having ethylene-propylene rubber as a soft segment and PP as a hard segment;
b-6: "Sunplane 7206" made by Mitsubishi Kagaku MKV Co., a polyvinyl chloride based elastomer;
c-1: "Sebian 510" made by Daicel Kagaku Kogyo Co., ABS resin;
c-2: "Daicel Styrol R81" made by Daicel Kagaku Kogyo Co., an impact resistant polystyrene;
c-3: "Panlite L1225" made by Teijin Co., a polycarbonate resin;
c-4: "AcrypetMD" made by Mitsubishi Rayon Co., polymethylmethacrylate;
c-5: "Noblen D501" made by Sumitomo Kagaku Kogyo Co., polypropylene;
c-6: "Juranex400FP" made by Polyplastic Co., polybutylene-terephthalate;
c-7: "Sin-etsu PVCTK 600" made by Shin-etsu Kagaku Kogyo Co., polyvinyl chloride;
c-8: "Nylon 1013B" made by Ube Kosan Co., nylon 6;
c-9: "Nolyl 731" made by Nihon GE Plastics Co., a modified polyphenylene ether resin;
d-1: "PEO Amine 6000" made by Kawaken Fine Chemical Co., polyethyleneoxidediamine;
d-2: "Bondine AX 8000" made by Sumitomo Kagaku Kogyo Co., an ethylene-maleic anhydride-ethyl acrylate copolymer, content of the maleic anhydride-ethyl acrylate comonomer=5% by weight;
d-3: "Sumiaid 300G" made by Sumitomo Kagaku Kogyo Co., a saponification product of an ethylene-vinyl acetate copolymer;
d-4: "Neukrel N1035" made by Mituis Du Pont Polychemical Co., an ethylene-methacrylic acid copolymer containing 10% by weight of methacrylic acid;
e-1: diphenylamine;
e-2: triethylbenzylammonium chloride;
e-3: dibutyl tin dilaurate.

Example 1 to 16

Each heat-fusion composition and hard resin were heat-fused with each other in the blending proportions shown in TABLE 1 to 2 and TABLE 3 to 4 using the epoxydized block copolymer (a-l) with a dual-layer extrusion molding machine with a diameter of 30 mm. The results of measurements were as shown in Table 3 to 4. The heat-fusion property tends to be higher when the blending proportion of the epoxydized block copolymer is larger with a few exceptions.

Example 17 to 41

Each heat-fusion composition and hard resin were heat-fused with each other in the blending proportions shown in TABLE 5 to 7 and TABLE 8 to 10 using the epoxydized block copolymer (a-2) by a injection molding insert method. The results of measurements were as shown in TABLE 8 to 10. Although the heat-fusion property is speculated to be low in the insert molding with a low surface temperature of the primary material (a hard resin) since the degree of molecular interlock with the secondary material (a heat-fusion composition) is small, the multi-layer molded body according to the present invention exhibits a high heat-fusion property.

Example 42 to 71

Each heat-fusion composition and hard resin were heat-fused with each other in blending proportions shown in TABLE 11 to 13 and TABLE 14 to 16 using the epoxydized block copolymer (a-3) with an injection molding machine. The results of measurements were as shown in TABLE 14 to 16. The epoxydized block copolymer (a-3) having a higher epoxy equivalent tends to have a little lower heat-fusion property than the epoxydized block copolymer (a-2) since the former has a lower epoxy concentration than the latter.

Comparative Example 1 to 9

Each heat-fusion composition and hard resin were heat-fused with each other in the blending proportions shown in TABLE 17 and TABLE 18 using the epoxydized block copolymer (a-1) with a dual extrusion molding machine with a diameter of 30 mm. The results of measurements were as shown in TABLE 18. The heat fusion property becomes lower in the sample with a blending ratio of the epoxydized block copolymer of less than 20% by weight. When the blending ratio of the epoxydized block copolymer exceeds 80% by weight, on the other hand, mold release property from the touch roll in the extrusion molding becomes of problem. When the blending amount to be added in the heat-fusion composition is too large, the surface hardness becomes so high that a good feeling of the elastomer is lost. When the blending amount of the polyfunctional compounds to be added in the heat-fusion composition is too large, a large amount of gel tends to appear to impair good appearance.

Comparative Example 10 to 18

Each heat-fusion composition and hard resin were heat-fused with each other in the blending proportions shown in TABLE 19 and TABLE 20 using the epoxydized block copolymer (a-2) with an injection molding machine.

The results of the measurements were as shown in TABLE 20. The same results as shown in Comparative example 1 to 9 were observed when the epoxy equivalent of the epoxydized block copolymer was changed and the processing method was changed to an injection molding insert. When the amount of use of the accelerating agent for the curing reaction of epoxy groups exceeds 2 parts by weight, gel formation was increased thereby impairing the appearence.

Example 19 to 27

Each heat-fusion composition and hard resin were heat-fused with each other in the blending proportions shown in TABLE 21 and TABLE 22 using the epoxydized block copolymer (a-3) with an injection molding machine. The results of the measurements were as shown in TABLE 22. The same results as shown in Comparative example 10 to 18 were observed when the epoxy equivalent of the epoxydized block copolymer was changed.

Industrial Applicability

As disclosed herein, a multi-layer molded body having an excellent heat-fusion property can be obtained by heat-fusing the heat-fusion composition blended with the epoxydized block copolymer according to the present invention with the hard resin. Although the heat-fusion property is usually speculated to be low especially in the insert molding with a low surface temperature of the primary material (a hard resin) since the degree of molecular interlock with the secondary material is small, the multi-layer molded body according to the present invention has a high heat-fusion property even in this case. The molded bodies obtained can be used for a turn table of a CD-ROM driver, a side braid of the door of a car, clips and handles of the electric appliances, spacers, packings, air bag covers, push buttons of the key board of a personal computer, sound damping gear and sports shoes sole and so on.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Heat-fusion composition | *1 (a) | a-1 | 60 | 70 | 80 | 40 | 40 | 80 | 80 | 60 | 70 | 50 |
| | | a-2 | | | | | | | | | | |
| | | a-3 | | | | | | | | | | |
| | *2 (b) | b-1 | | | | | | 60 | | | | 50 |
| | | b-2 | 40 | | | 60 | | | | 30 | | |
| | | b-3 | | | | | 20 | | | | | |
| | | b-4 | | | 20 | | | | | | | |
| | | b-5 | | 30 | | | | | | 40 | | |
| | | b-6 | | | | | | 20 | | | | |
| | *3 (c) | c-1 | | | | 30 | | | | | | |
| | | c-2 | | | | | | | | | | |
| | | c-3 | | | | | | | | | | |
| | | c-4 | | | | | | | | | | |
| | | c-5 | | | | | | | 40 | 30 | | |
| | | c-6 | | | | | | | | 20 | | |
| | | c-7 | | | | | | | | | | |
| | | c-8 | | 20 | | | | | | | | |
| | | c-9 | | | | | | | | | | |
| | *4 (d) | d-1 | | | | | | | | | | |
| | | d-2 | | 20 | | | | | | | | |
| | | d-3 | | | | | | | | | | |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| | d-4 | | | | | | | | | | |
| *5 (e) | e-1 | | | | | | | | | | |
| | e-2 | | | | | | | | | | |
| | e-3 | | | | | | | | | | |

*1 (a): Epoxydized copolymer, the figures are expressed in % by weight, ((a) + (b)) is equal to 100% by weight.
*2 (b): Thermoplastic elastomer, the figures are expressed in % by weight, ((a) + (b)) is equal to 100% by weight.
*3 (c): Hard resin, the figures correspond to parts by weight per 100 parts by weight of ((a) + (b)).
*4 (d): Polyfunctional compound, the figures correspond to parts by weight per 100 parts by weight of ((a) + (b)).
*5 (e): Epoxy reaction accelerating agent, the figures correspond to parts by weight per 100 parts by weight of ((a) + (b)).

These abbreviations are commonly used in TABLE 1 to TABLE 22.

TABLE 2

| | | | Example | | | | | |
|---|---|---|---|---|---|---|---|---|
| | | | 11 | 12 | 13 | 14 | 15 | 16 |
| Heat-fusion composition | (a) | a-1 | 30 | 50 | 50 | 20 | 40 | 50 |
| | | a-2 | | | | | | |
| | | a-3 | | | | | | |
| | (b) | b-1 | 70 | | | 80 | | 50 |
| | | b-2 | | 50 | | | | |
| | | b-3 | | | 50 | | | |
| | | b-4 | | | | | | |
| | | b-5 | | | | | 60 | |
| | | b-6 | | | | | | |
| | (c) | c-1 | | | | | | |
| | | c-2 | | | | | | |
| | | c-3 | | | 50 | | | |
| | | c-4 | | | | | | |
| | | c-5 | | | | | | |
| | | c-6 | | | | | | |
| | | c-7 | | | | | | |
| | | c-8 | | | | | | |
| | | c-9 | | | | | | 20 |
| | (d) | d-1 | | | | 2 | | |
| | | d-2 | 10 | | | | | |
| | | d-3 | | | | | | 10 |
| | | d-4 | | 20 | | | 20 | |
| | (e) | e-1 | | | | 0.1 | | |
| | | e-2 | 0.1 | | | | | |
| | | e-3 | | | | | | |

TABLE 3

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Hard resin composition | (c) | c-1 | | | | | 100 | | | | | 100 |
| | | c-2 | | | | | | | | | | |
| | | c-3 | 100 | | | | | 100 | | | | |
| | | c-4 | | | 100 | | | | | | | |
| | | c-5 | | | | | | | 100 | 100 | | |
| | | c-6 | | | | | | | | | 100 | |
| | | c-7 | | | | | | | | | | |
| | | c-8 | | 100 | | | | | | | | |
| | | c-9 | | | | 100 | | | | | | |
| | (d) | d-1 | | | | | | | | | 10 | |
| | | d-2 | | 10 | | | | | | 20 | | |
| | | d-3 | | | | | | | | | | |
| | | d-4 | | | | | | | 20 | | | |
| | (e) | e-1 | | | 0.5 | | | | | | | |
| | | e-2 | | | | | | | 1 | 1 | | |
| | | e-3 | | | | | | | | | | |
| Heat fusion property (1) | | | — | — | — | — | — | — | — | — | — | — |
| Heat fusion property (2) | | | 15 | 20 | 16 | 13 | 17 | 14 | 13 | 12 | 13 | 18 |
| Surface hardness (A) | | | 70 | 70 | 70 | 70 | 65 | 70 | 80 | 75 | 70 | 65 |
| Mold release property | | | ○ | ○ | ○ | ○ | ○ | ○ | ○ | ○ | ○ | ○ |
| Gel | | | ○ | ○ | ○ | ○ | ○ | ○ | ○ | ○ | ○ | ○ |

TABLE 4

| | | | Example | | | | | |
|---|---|---|---|---|---|---|---|---|
| | | | 11 | 12 | 13 | 14 | 15 | 16 |
| Hard resin composition | (c) | c-1 | | | | | | |
| | | c-2 | 100 | | | | 100 | |
| | | c-3 | | 100 | 100 | | | |
| | | c-4 | | | | | | |
| | | c-5 | | | | | | |
| | | c-6 | | | | | | 100 |
| | | c-7 | | | | | | |
| | | c-8 | | | | | | |
| | | c-9 | | | | 100 | | |
| | (d) | d-1 | | | | | | |
| | | d-2 | | 10 | | | | |
| | | d-3 | | | | | | |
| | | d-4 | | | | | 20 | |
| | (e) | e-1 | | | | | | 0.01 |
| | | e-2 | | | | | | |
| | | e-3 | | | 1 | | | |
| Heat fusion property (1) | | | — | — | — | — | — | — |
| Heat fusion property (2) | | | 14 | 22 | 12 | 13 | 15 | 20 |
| Surface hardness (A) | | | 85 | 65 | 80 | 70 | 70 | 70 |
| Mold release property | | | ○ | ○ | ○ | ○ | ○ | ○ |
| Gel | | | ○ | ○ | ○ | ○ | ○ | ○ |

TABLE 5

| | | | Example | | | | | | | | | |
|---|---|---|---|---|---|---|---|---|---|---|---|---|
| | | | 17 | 18 | 19 | 20 | 21 | 22 | 23 | 24 | 25 | 26 |
| Heat-fusion composition | (a) | a-1 | | | | | | | | | | |
| | | a-2 | 30 | 30 | 50 | 40 | 40 | 30 | 20 | 50 | 60 | 30 |
| | | a-3 | | | | | | | | | | |
| | (b) | b-1 | | | | | 80 | | | | 70 | |
| | | b-2 | 70 | | | | | | | | | |
| | | b-3 | | 70 | | 60 | | | 50 | | | |
| | | b-4 | | | | | | 70 | | | | |
| | | b-5 | | | 50 | 60 | | | | | | |
| | | b-6 | | | | | | | | 40 | | |
| | (c) | c-1 | | | | | | | | | | |
| | | c-2 | | | | | | | | | | |
| | | c-3 | | | | | | | | | | |
| | | c-4 | | | | | | | | | | |
| | | c-5 | | | | | | | | | | |
| | | c-6 | | | | | | | | | | |
| | | c-7 | | | | | | | | | | |
| | | c-8 | | | | | | | | 30 | | |
| | | c-9 | | | | | | | | | | |
| | (d) | d-1 | | | | | | | | | | |
| | | d-2 | | | | | | | 20 | | | |
| | | d-3 | | | | | | | | | | |
| | | d-4 | | | | 20 | | | | | | |
| | (e) | e-1 | | | | | | | | | | |
| | | e-2 | | | | | | | | | | |
| | | e-3 | | | | | | | | | | |

TABLE 6

| | | | Example | | | | | | | | | |
|---|---|---|---|---|---|---|---|---|---|---|---|---|
| | | | 27 | 28 | 29 | 30 | 31 | 32 | 33 | 34 | 35 | 36 |
| Heat-fusion composition | (a) | a-1 | | | | | | | | | | |
| | | a-2 | 30 | 20 | 40 | 50 | 50 | 20 | 30 | 60 | 50 | 40 |
| | | a-3 | | | | | | | | | | |
| | (b) | b-1 | | | 60 | | | | | 70 | | 60 |
| | | b-2 | | 80 | | | | | | | | |
| | | b-3 | | | | 50 | 50 | | | | | |
| | | b-4 | | | | | | | 40 | | | |
| | | b-5 | 70 | | | | | 80 | | | | |
| | | b-6 | | | | | | | | | 50 | |
| | (c) | c-1 | | | | | | | | | | |
| | | c-2 | | | | | | | | | | 40 |
| | | c-3 | | | | | | | | | | |
| | | c-4 | | | | | | | | | | |
| | | c-5 | 30 | | | | 20 | | | | | |
| | | c-6 | | | 40 | | | | | | | |
| | | c-7 | | | | | | | | | 20 | |
| | | c-8 | | 20 | | | | | 40 | | | |
| | | c-9 | | | | | | | | | | |
| | (d) | d-1 | | | | | | | | | | |
| | | d-2 | | | | | | | | | | |
| | | d-3 | | | | | | | | | | |
| | | d-4 | | | | | | | | | | |

TABLE 6-continued

| | | | Example | | | | | | | | | |
|---|---|---|---|---|---|---|---|---|---|---|---|---|
| | | | 27 | 28 | 29 | 30 | 31 | 32 | 33 | 34 | 35 | 36 |
| (e) | e-1 | | | | | | | | | | | |
| | e-2 | | | | | | | | | | | |
| | e-3 | | | | | | | | | | | |

TABLE 7

| | | | Example | | | | |
|---|---|---|---|---|---|---|---|
| | | | 37 | 38 | 39 | 40 | 41 |
| Heat-fusion composition | (a) | a-1 | | | | | |
| | | a-2 | 80 | 50 | 70 | 50 | 60 |
| | | a-3 | | | | | |
| | (b) | b-1 | 20 | 50 | | | 40 |
| | | b-2 | | | | 50 | |
| | | b-3 | | | | | |
| | | b-4 | | | | | |
| | | b-5 | | | | | |
| | | b-6 | | | 30 | | |
| | (c) | c-1 | | | | | |

TABLE 7-continued

| | | | Example | | | | |
|---|---|---|---|---|---|---|---|
| | | | 37 | 38 | 39 | 40 | 41 |
| | | c-2 | | | | | |
| | | c-3 | | | | | |
| | | c-4 | | | | | |
| | | c-5 | | | | 10 | |
| | | c-6 | | | | | |
| | | c-7 | | | | | |
| | | c-8 | | | | | |
| | | c-9 | | | | | |
| | (d) | d-1 | | | | | |
| | | d-2 | | | | | |
| | | d-3 | | | | | |
| | | d-4 | | 10 | | | |
| | (e) | e-1 | | | | | |
| | | e-2 | | | | | |
| | | e-3 | | | | | |

TABLE 8

| | | | Example | | | | | | | | | |
|---|---|---|---|---|---|---|---|---|---|---|---|---|
| | | | 17 | 18 | 19 | 20 | 21 | 22 | 23 | 24 | 25 | 26 |
| Hard resin composition | (c) | c-1 | | | | | | | | | | |
| | | c-2 | | | | | | | | | | |
| | | c-3 | | | | | | | | | 100 | |
| | | c-4 | | | | | | | | 100 | | |
| | | c-5 | | | 100 | 100 | | | | | | |
| | | c-6 | | 100 | | | 100 | | | | | |
| | | c-7 | | | | | | | | | 100 | |
| | | c-8 | 100 | | | | | 100 | | | | |
| | | c-9 | | | | | | | | | | 100 |
| | (d) | d-1 | | | | | | | | | | |
| | | d-2 | | | | 20 | 10 | | | | | |
| | | d-3 | | | 20 | | | | | | 10 | |
| | | d-4 | | | | | | | | | | |
| | (e) | e-1 | 0.1 | | | | | | | | | |
| | | e-2 | | | | | | | | 0.1 | | |
| | | e-3 | | | | | | | | | | |
| Heat fusion property (1) | | | 12 | 12 | 11 | 11 | 12 | 9 | 8 | 11 | 12 | 12 |
| Heat fusion property (2) | | | — | — | — | — | — | — | — | — | — | — |
| Surface hardness (A) | | | 65 | 80 | 65 | 65 | 75 | 80 | 66 | 75 | 65 | 65 |
| Mold release | | | ○ | ○ | ○ | ○ | ○ | ○ | ○ | ○ | ○ | ○ |
| Gel | | | ○ | ○ | ○ | ○ | ○ | ○ | ○ | ○ | ○ | ○ |

TABLE 9

| | | | Example | | | | | | | | | |
|---|---|---|---|---|---|---|---|---|---|---|---|---|
| | | | 27 | 28 | 29 | 30 | 31 | 32 | 33 | 34 | 35 | 36 |
| Hard resin composition | (c) | c-1 | | | 100 | | | | | | | |
| | | c-2 | | | | | | | | 100 | | |
| | | c-3 | | | | | 100 | | | | | |
| | | c-4 | | | | | | | | | | |
| | | c-5 | 100 | | | | | 100 | | | | |

TABLE 9-continued

|  |  | \multicolumn{10}{c}{Example} |
| --- | --- | --- | --- | --- | --- | --- | --- | --- | --- | --- | --- |
|  |  | 27 | 28 | 29 | 30 | 31 | 32 | 33 | 34 | 35 | 36 |
|  | c-6 |  |  |  | 100 |  |  |  |  |  |  |
|  | c-7 |  |  |  |  |  |  |  |  | 100 |  |
|  | c-8 |  | 100 |  |  |  |  |  | 100 |  |  |
|  | c-9 |  |  |  |  |  |  |  |  |  | 100 |
| (d) | d-1 |  |  |  |  |  |  |  |  |  |  |
|  | d-2 |  |  |  |  |  |  |  |  |  | 20 |
|  | d-3 |  |  |  |  |  |  |  |  |  |  |
|  | d-4 |  |  |  | 10 |  |  |  |  |  |  |
| (e) | e-1 |  |  |  | 0.1 |  |  |  |  |  |  |
|  | e-2 |  |  |  |  |  |  |  |  |  |  |
|  | e-3 |  |  |  |  |  | 1 | 1 |  |  |  |
| Heat fusion property (1) |  | 8 | 7 | 12 | 6 | 13 | 6 | 11 | 7 | 10 | 8 |
| Heat fusion property (2) |  | — | — | — | — | — | — | — | — | — | — |
| Surface hardness (A) |  | 75 | 75 | 65 | 80 | 75 | 70 | 65 | 80 | 70 | 75 |
| Mold release property |  | ○ | ○ | ○ | ○ | ○ | ○ | ○ | ○ | ○ | ○ |
| Gel |  | ○ | ○ | ○ | ○ | ○ | ○ | ○ | ○ | ○ | ○ |

TABLE 10

|  |  |  | \multicolumn{5}{c}{Example} |
| --- | --- | --- | --- | --- | --- | --- | --- |
|  |  |  | 37 | 38 | 39 | 40 | 41 |
| Hard resin composition | (c) | c-1 | 100 |  |  |  |  |
|  |  | c-2 |  | 100 | 100 |  |  |
|  |  | c-3 |  |  |  | 100 |  |
|  |  | c-4 |  |  |  |  | 100 |
|  |  | c-5 |  |  |  |  |  |
|  |  | c-6 |  |  |  |  |  |
|  |  | c-7 |  |  |  |  |  |
|  |  | c-8 |  |  |  |  |  |
|  |  | c-9 |  |  |  |  |  |
|  | (d) | d-1 |  |  |  |  |  |
|  |  | d-2 |  |  |  |  |  |
|  |  | d-3 |  |  |  |  |  |
|  |  | d-4 |  |  |  |  |  |
|  | (e) | e-1 |  |  |  |  |  |
|  |  | e-2 |  |  |  |  |  |
|  |  | e-3 |  | 1 |  |  |  |
| Heat fusion property (1) |  |  | 16 | 13 | 14 | 11 | 13 |
| Heat fusion property (2) |  |  | — | — | — | — | — |
| Surface hardness (A) |  |  | 65 | 65 | 65 | 65 | 65 |
| Mold release property |  |  | ○ | ○ | ○ | ○ | ○ |
| Gel |  |  | ○ | ○ | ○ | ○ | ○ |

TABLE 11

|  |  |  | \multicolumn{10}{c}{Example} |
| --- | --- | --- | --- | --- | --- | --- | --- | --- | --- | --- | --- | --- |
|  |  |  | 42 | 43 | 44 | 45 | 46 | 47 | 48 | 49 | 50 | 51 |
| Heat-fusion composition | (a) | a-1 |  |  |  |  |  |  |  |  |  |  |
|  |  | a-2 |  |  |  |  |  |  |  |  |  |  |
|  |  | a-3 | 40 | 80 | 40 | 40 | 40 | 40 | 40 | 40 | 40 | 30 |
|  | (b) | b-1 |  |  |  | 60 | 60 |  |  | 60 | 60 |  |
|  |  | b-2 |  |  |  |  |  | 60 |  |  |  |  |
|  |  | b-3 |  |  | 60 |  |  |  | 60 |  |  |  |
|  |  | b-4 | 60 |  |  |  |  |  |  |  |  |  |
|  |  | b-5 |  |  |  |  |  |  |  |  |  | 70 |
|  |  | b-6 |  | 20 |  |  |  |  |  |  |  |  |
|  | (c) | c-1 |  |  |  |  | 20 |  |  |  |  |  |
|  |  | c-2 |  |  |  |  |  |  |  |  | 50 |  |
|  |  | c-3 |  |  |  |  |  |  |  |  |  |  |
|  |  | c-4 |  |  |  |  |  |  |  |  |  |  |
|  |  | c-5 |  |  |  |  |  |  |  |  |  | 30 |
|  |  | c-6 |  |  |  | 40 |  |  |  |  |  |  |
|  |  | c-7 |  |  |  |  |  |  |  |  |  |  |
|  |  | c-8 |  | 30 |  |  |  |  |  |  |  |  |
|  |  | c-9 |  |  |  |  |  |  |  |  |  |  |

TABLE 11-continued

|  |  |  | \multicolumn{10}{c}{Example} |
| --- | --- | --- | --- | --- | --- | --- | --- | --- | --- | --- | --- | --- |
|  |  |  | 42 | 43 | 44 | 45 | 46 | 47 | 48 | 49 | 50 | 51 |
|  | (d) | d-1 |  |  |  | 10 |  |  |  |  |  |  |
|  |  | d-2 |  |  |  |  |  |  |  |  |  |  |
|  |  | d-3 |  |  |  |  |  |  |  |  |  |  |
|  |  | d-4 |  |  |  |  |  |  |  |  |  | 20 |
|  | (e) | e-1 |  |  |  |  |  |  |  |  |  |  |
|  |  | e-2 |  |  |  |  |  |  |  |  |  |  |
|  |  | e-3 |  |  |  |  |  |  |  |  |  |  |

TABLE 12

|  |  |  | \multicolumn{10}{c}{Example} |
| --- | --- | --- | --- | --- | --- | --- | --- | --- | --- | --- | --- | --- |
|  |  |  | 52 | 53 | 54 | 55 | 56 | 57 | 58 | 59 | 60 | 61 |
| Heat-fusion composition | (a) | a-1 |  |  |  |  |  |  |  |  |  |  |
|  |  | a-2 |  |  |  |  |  |  |  |  |  |  |
|  |  | a-3 | 50 | 50 | 60 | 50 | 50 | 70 | 50 | 50 | 50 | 80 |
|  | (b) | b-1 | 50 |  |  |  |  |  | 50 |  | 50 |  |
|  |  | b-2 |  |  | 40 |  | 50 |  |  |  |  |  |
|  |  | b-3 |  | 50 |  |  |  |  |  | 50 |  |  |
|  |  | b-4 |  |  |  |  |  |  |  |  |  | 20 |
|  |  | b-5 |  |  |  | 50 |  |  |  |  |  |  |
|  |  | b-6 |  |  |  |  |  | 30 |  |  |  |  |
|  | (c) | c-1 |  |  |  |  |  |  |  |  |  |  |
|  |  | c-2 |  |  |  |  |  |  | 30 |  |  |  |
|  |  | c-3 |  |  |  |  |  |  |  |  |  |  |
|  |  | c-4 |  |  |  |  |  |  |  |  |  |  |
|  |  | c-5 |  |  |  | 50 |  |  |  |  |  |  |
|  |  | c-6 | 50 |  |  |  |  |  |  |  |  |  |
|  |  | c-7 |  |  |  |  |  |  |  |  |  |  |
|  |  | c-8 |  |  |  |  |  |  |  |  |  |  |
|  |  | c-9 |  |  |  |  |  |  |  |  |  |  |
|  | (d) | d-1 |  |  |  |  |  |  |  |  |  |  |
|  |  | d-2 | 10 |  |  |  |  |  |  |  |  |  |
|  |  | d-3 |  |  |  |  |  |  |  |  |  |  |
|  |  | d-4 |  |  |  |  |  |  |  |  |  |  |
|  | (e) | e-1 |  |  |  |  |  |  |  |  |  |  |
|  |  | e-2 |  |  |  |  |  |  |  |  |  |  |
|  |  | e-3 |  |  |  |  |  |  |  |  |  |  |

TABLE 13

| | | | Example | | | | | | | | | |
|---|---|---|---|---|---|---|---|---|---|---|---|---|
| | | | 62 | 63 | 64 | 65 | 66 | 67 | 68 | 69 | 70 | 71 |
| Heat-fusion composition | (a) | a-1 | | | | | | | | | | |
| | | a-2 | | | | | | | | | | |
| | | a-3 | 80 | 70 | 60 | 80 | 60 | 70 | 60 | 60 | 50 | 70 |
| | (b) | b-1 | | | | 20 | 40 | | | | 50 | 30 |
| | | b-2 | | | | | | | 40 | | | |
| | | b-3 | | 30 | 40 | | | | | | | |
| | | b-4 | 20 | | | | | 30 | | | | |
| | | b-5 | | | | | | | | | | |
| | | b-6 | | | | | | | | 40 | | |
| | (c) | c-1 | | | | | | | | | | |
| | | c-2 | | | | | | | | | | |
| | | c-3 | | | | | | | | | | |
| | | c-4 | | | | | | | | | | |
| | | c-5 | | | | | | | | | | |
| | | c-6 | | | | | | 20 | | | | |
| | | c-7 | | | | | | | | 20 | | |
| | | c-8 | | | | | 40 | | | | | |
| | | c-9 | | | | | | | | | | |
| | (d) | d-1 | | | | | | | | | | |
| | | d-2 | | | | | | | | | | |
| | | d-3 | | | | | | | | | | 10 |
| | | d-4 | | | | | | | | | | |
| | (e) | e-1 | | | | | | | | | | |
| | | e-2 | | | | | | | | | | |
| | | e-3 | | | | | | | | | | |

TABLE 14

| | | | Example | | | | | | | | | |
|---|---|---|---|---|---|---|---|---|---|---|---|---|
| | | | 42 | 43 | 44 | 45 | 46 | 47 | 48 | 49 | 50 | 51 |
| Hard resin composition | (c) | c-1 | | | | 100 | | | 100 | | | |
| | | c-2 | | | | | | | | | 100 | |
| | | c-3 | | | | | 100 | | | | | |
| | | c-4 | | | | | | 100 | | | | |
| | | c-5 | | | | | | | | | | 100 |
| | | c-6 | | | 100 | | | | | | | |
| | | c-7 | | 100 | | | | | | | | |
| | | c-8 | 100 | | | | | | | | | |
| | | c-9 | | | | | | | | 100 | | |
| | (d) | d-1 | | | | | | | | | | |
| | | d-2 | | | | | | | | | | |
| | | d-3 | | | | | | | | | | |
| | | d-4 | | | | | | | | | | |
| | (e) | e-1 | 0.1 | | | | | | | | | |
| | | e-2 | | | | | | | | | | |
| | | e-3 | | | | | | | | | | 0.5 |
| Heat fusion property (1) | | | 9 | 15 | 6 | 12 | 9 | 11 | 11 | 7 | 10 | 10 |
| Heat fusion property (2) | | | — | — | — | — | — | — | — | — | — | — |
| Surface hardness (A) | | | 80 | 65 | 80 | 65 | 70 | 80 | 65 | 80 | 65 | 70 |
| Mold release property | | | ○ | ○ | ○ | ○ | ○ | ○ | ○ | ○ | ○ | ○ |
| Gel | | | ○ | ○ | ○ | ○ | ○ | ○ | ○ | ○ | ○ | ○ |

TABLE 15

| | | | Example | | | | | | | | | |
|---|---|---|---|---|---|---|---|---|---|---|---|---|
| | | | 52 | 53 | 54 | 55 | 56 | 57 | 58 | 59 | 60 | 61 |
| Hard resin composition | (c) | c-1 | 100 | | | | | | | | | |
| | | c-2 | | | | | | | 100 | | | 100 |
| | | c-3 | | | 100 | | | | | | 100 | |
| | | c-4 | | | | | | | | | 100 | |
| | | c-5 | | | | 100 | | | | | | |
| | | c-6 | | 100 | | | | | | | | |
| | | c-7 | | | | | | 100 | | | | |
| | | c-8 | | | | | 100 | | | | | |
| | | c-9 | | | | | | | | 100 | | |
| | (d) | d-1 | | | | | | | | | | |
| | | d-2 | | | | | | | | | | |
| | | d-3 | | | | | | | | | | |

TABLE 15-continued

| | | | Example | | | | | | | | | |
|---|---|---|---|---|---|---|---|---|---|---|---|---|
| | | | 52 | 53 | 54 | 55 | 56 | 57 | 58 | 59 | 60 | 61 |
| | (e) | d-4 | | | | | | | | | | |
| | | e-1 | | | | | | | | | | |
| | | e-2 | | | | 0.1 | | | | | | |
| | | e-3 | 0.1 | | | | | | 0.1 | | | |
| Heat fusion property (1) | | | 12 | 7 | 10 | 6 | 9 | 11 | 14 | 10 | 10 | 14 |
| Heat fusion property (2) | | | — | — | — | — | — | — | — | — | — | — |
| Surface hardness (A) | | | 65 | 80 | 65 | 80 | 85 | 65 | 70 | 75 | 65 | 70 |
| Mold release property | | | ○ | ○ | ○ | ○ | ○ | ○ | ○ | ○ | ○ | ○ |
| Gel | | | ○ | ○ | ○ | ○ | ○ | ○ | ○ | ○ | ○ | ○ |

TABLE 16

| | | | Example | | | | | | | | | |
|---|---|---|---|---|---|---|---|---|---|---|---|---|
| | | | 62 | 63 | 64 | 65 | 66 | 67 | 68 | 69 | 70 | 71 |
| Hard resin composition | (c) | c-1 | 100 | | | | | | | 100 | | 100 |
| | | c-2 | | | | | 100 | | | | 100 | |
| | | c-3 | | 100 | | | | | | | | |
| | | c-4 | | | | | | | | | | |
| | | c-5 | | | | | | | | | | |
| | | c-6 | | | 100 | | | | | | | |
| | | c-7 | | | | | | | 100 | | | |
| | | c-8 | | | | | | 100 | | | | |
| | | c-9 | | | | 100 | | | | | | |
| | (d) | d-1 | | | | | | | | | | |
| | | d-2 | | | | | | | | | 10 | |
| | | d-3 | | | | | | | | 10 | | |
| | | d-4 | | | | | | | | | | |
| | (e) | e-1 | | | | | | | | | | |
| | | e-2 | | | | | | | | | | |
| | | e-3 | | | | | | | | | | 0.1 |
| Heat fusion property (1) | | | 14 | 12 | 10 | 17 | 10 | 11 | 10 | 11 | 11 | 14 |
| Heat fusion property (2) | | | — | — | — | — | — | — | — | — | — | — |
| Surface hardness (A) | | | 65 | 70 | 80 | 65 | 65 | 80 | 70 | 65 | 65 | 65 |
| Mold release property | | | ○ | ○ | ○ | ○ | ○ | ○ | ○ | ○ | ○ | ○ |
| Gel | | | ○ | ○ | ○ | ○ | ○ | ○ | ○ | ○ | ○ | ○ |

TABLE 17

| | | | Comparative example | | | | | | | | |
|---|---|---|---|---|---|---|---|---|---|---|---|
| | | | 1 | 2 | 3 | 4 | 5 | 6 | 7 | 8 | 9 |
| Hard resin composition | (a) | a-1 | 10 | 10 | 10 | 10 | 10 | 10 | 90 | 90 | 70 |
| | | a-2 | | | | | | | | | |
| | | a-3 | | | | | | | | | |
| | (b) | b-1 | 90 | | | | | | 10 | 10 | |
| | | b-2 | | 90 | | | | | | | |
| | | b-3 | | | 90 | | | | | | |
| | | b-4 | | | | 90 | | | | | |
| | | b-5 | | | | | 90 | | | | 30 |
| | | b-6 | | | | | | 90 | | | |
| | (c) | c-1 | | | | | | | | | |
| | | c-2 | | | | | | | | 60 | |
| | | c-3 | | | | | | | | | |
| | | c-4 | | | | | | | | | |
| | | c-5 | | | | | | | | | |
| | | c-6 | | | | | | | | | |
| | | c-7 | | | | | | | | | |
| | | c-8 | | | | | | | | | 20 |
| | | c-9 | | | | | | | | | |
| | (d) | d-1 | | | | | | | | | |
| | | d-2 | | | | | | | | | 40 |
| | | d-3 | | | | | | | | | |
| | | d-4 | | | | | | | | | |
| | (e) | e-1 | | | | | | | | | |
| | | e-2 | | | | | | | | | |
| | | e-3 | | | | | | | | | |

TABLE 18

| | | | Comparative example | | | | | | | | |
|---|---|---|---|---|---|---|---|---|---|---|---|
| | | | 1 | 2 | 3 | 4 | 5 | 6 | 7 | 8 | 9 |
| Hard resin composition | (c) | c-1 | | 100 | | | | | 100 | | |
| | | c-2 | 100 | | | | | | | | |
| | | c-3 | | | | | | | | | |
| | | c-4 | | | | | | | | | 100 |
| | | c-5 | | | | | 100 | | | | |
| | | c-6 | | | 100 | | | | | | |
| | | c-7 | | | | | | 100 | | | |
| | | c-8 | | | | 100 | | | | | |
| | | c-9 | | | | | | | | 100 | |
| | (d) | d-1 | | | | | 20 | | | | |
| | | d-2 | | | | | | | | | |
| | | d-3 | | | | | | | | | |
| | | d-4 | | | | | | | | | |
| | (e) | e-1 | | | | | 0.5 | | | | |
| | | e-2 | | | | | | | | | |
| | | e-3 | 0.5 | | | | | | | | |
| Heat fusion property (1) | | | — | — | — | — | — | — | — | — | — |
| Heat fusion property (2) | | | 4 | 4 | 2 | 4 | 2 | 5 | 21 | 17 | 14 |
| Surface hardness (A) | | | 65 | 65 | 100 or more | 100 or more | 65 | 65 | 65 | 95 | 70 |
| Mold release property | | | o | o | o | o | o | o | x | o | o |
| Gel | | | o | o | o | o | o | o | o | o | x |

TABLE 19

| | | | Comparative example | | | | | | | | |
|---|---|---|---|---|---|---|---|---|---|---|---|
| | | | 10 | 11 | 12 | 13 | 14 | 15 | 16 | 17 | 18 |
| Hard resin composition | (a) | a-1 | | | | | | | | | |
| | | a-2 | 10 | 10 | 10 | 10 | 10 | 10 | 90 | 90 | 80 |
| | | a-3 | | | | | | | | | |
| | (b) | b-1 | 90 | | | | | | 10 | | 20 |
| | | b-2 | | 90 | | | | | | | |
| | | b-3 | | | 90 | | | | | 10 | |
| | | b-4 | | | | 90 | | | | | |
| | | b-5 | | | | | 90 | | | | |
| | | b-6 | | | | | | 90 | | | |
| | (c) | c-1 | | | | | | | | | |
| | | c-2 | | | | | | | | | |
| | | c-3 | | | | | | | | | |
| | | c-4 | | | | | | | | | |
| | | c-5 | | | | | | | | | |
| | | c-6 | | | | | | | | | 60 |
| | | c-7 | | | | | | | | | |
| | | c-8 | | | | | | | | | |
| | | c-9 | | | | | | | | | |
| | (d) | d-1 | | | | | | | | | |
| | | d-2 | | | | | | | | | |
| | | d-3 | | | | | | | | | |
| | | d-4 | | | | | | | | | |
| | (e) | e-1 | | | | | | | | | |
| | | e-2 | | | | | | | | | |
| | | e-3 | | | | | | | | | 3 |

TABLE 20

| | | | Comparative example | | | | | | | | |
|---|---|---|---|---|---|---|---|---|---|---|---|
| | | | 10 | 11 | 12 | 13 | 14 | 15 | 16 | 17 | 18 |
| Hard resin composition | (c) | c-1 | 100 | | | | | | | | |
| | | c-2 | | | | | | | | | |
| | | c-3 | | | | | | | | | |
| | | c-4 | | | | | | | | | |
| | | c-5 | | | | | 100 | | | | |
| | | c-6 | | | 100 | | | 100 | | 100 | |
| | | c-7 | | 100 | | 100 | | | 100 | | |
| | | c-8 | | | | 100 | 100 | | | | |
| | | c-9 | | | | | | | 100 | | 100 |
| | (d) | d-1 | 20 | | | | | | | | |
| | | d-2 | | | | | | | | | |
| | | d-3 | | | | | | | | | |
| | | d-4 | | | | | | | | | |
| | (e) | e-1 | | 0.1 | | 0.5 | | | | | |
| | | e-2 | | | | | | | | | |
| | | e-3 | | | | | 0.5 | | | | |
| Heat fusion property (1) | | | 3 | 2 | 2 | 4 | 2 | 3 | 19 | 11 | 12 |
| Heat fusion property (2) | | | — | — | — | — | — | — | — | — | — |

TABLE 20-continued

| | Comparative example | | | | | | | | |
|---|---|---|---|---|---|---|---|---|---|
| | 10 | 11 | 12 | 13 | 14 | 15 | 16 | 17 | 18 |
| Surface hardness (A) | 65 | 65 | 100 | 100 | 65 | 65 | 65 | 95 | 75 |
| Mold release property | ○ | ○ | ○ | ○ | ○ | ○ | x | ○ | ○ |
| Gel | ○ | ○ | ○ | ○ | ○ | ○ | ○ | ○ | many |

TABLE 21

| | | | Comparative example | | | | | | | | |
|---|---|---|---|---|---|---|---|---|---|---|---|
| | | | 19 | 20 | 21 | 22 | 23 | 24 | 25 | 26 | 27 |
| Hard resin composition | (a) | a-1 | | | | | | | | | |
| | | a-2 | | | | | | | | | |
| | | a-3 | 10 | 10 | 10 | 10 | 10 | 10 | 90 | 80 | 80 |
| | (b) | b-1 | 90 | | | | | | | | 20 |
| | | b-2 | | 90 | | | | | 10 | | |
| | | b-3 | | | 90 | | | | | 20 | |
| | | b-4 | | | | 90 | | | | | |
| | | b-5 | | | | | 90 | | | | |
| | | b-6 | | | | | | 90 | | | |
| | (c) | c-1 | | | | | | | | | |
| | | c-2 | | | | | | | 70 | | |
| | | c-3 | | | | | | | | | |
| | | c-4 | | | | | | | | | |
| | | c-5 | | | | | | | | | |
| | | c-6 | | | | | | | | | |
| | | c-7 | | | | | | | | | |
| | | c-8 | | | | | | | | | |
| | | c-9 | | | | | | | | | |
| | (d) | d-1 | | | | | | | | | |
| | | d-2 | | | | | | | | | |
| | | d-3 | | | | | | | | | |
| | | d-4 | | | | | | | | | |
| | (e) | e-1 | | | | | | | | | |
| | | e-2 | | | | | | | | | 3 |
| | | e-3 | | | | | | | | | |

TABLE 22

| | | | Comparative example | | | | | | | | |
|---|---|---|---|---|---|---|---|---|---|---|---|
| | | | 19 | 20 | 21 | 22 | 23 | 24 | 25 | 26 | 27 |
| Hard resin composition | (c) | c-1 | 100 | | | | | | | 100 | |
| | | c-2 | | 100 | | | | | 100 | | 100 |
| | | c-3 | | | | | | | | | |
| | | c-4 | | | | | | | | | |
| | | c-5 | | | | | 100 | | | | |
| | | c-6 | | | 100 | | | | | | |
| | | c-7 | | | | | | 100 | | | |
| | | c-8 | | | | 100 | | | | | |
| | | c-9 | | | | | | | | | |
| | (d) | d-1 | | | | | | | | | |
| | | d-2 | | | 20 | 20 | | | | | |
| | | d-3 | | | | | | | | | |
| | | d-4 | | | | | | | | | |
| | (e) | e-1 | | 0.1 | | 0.5 | | | | | |
| | | e-2 | | | | | | | | | |
| | | e-3 | | | | | 0.5 | | 0.5 | 0.5 | 0.5 |
| Heat fusion property (1) | | | 2 | 3 | 3 | 4 | 1 | 2 | 18 | 10 | 11 |
| Heat fusion property (2) | | | — | — | — | — | — | — | — | — | — |
| Surface hardness (A) | | | 65 | 65 | 100 | 100 | 65 | 65 | 70 | 85 | 95 |
| Mold release property | | | ○ | ○ | ○ | ○ | ○ | ○ | x | ○ | ○ |
| Gel | | | ○ | ○ | ○ | ○ | ○ | ○ | ○ | x | ○ |

What is claimed is:

1. A heat-fusion composition for molding into multi-layers comprising 20 to 80% by weight of a block copolymer having epoxy groups (a), which is an epoxidized block copolymer obtained by epoxiding (i) a block copolymer comprising a polymer block mainly composed of a vinyl aromatic hydrocarbon compound and a polymer block mainly composed of a conjugalated diene compound, or (ii) the hydrogenated product of said block copolymer, wherein the epoxidation is effected by peroxidation of the ethylenic double bonds and the epoxy equivalent of the epoxidized block copolymer is 140 to 10,000, and 80% to 20% by weight of at least one kind of thermoplastic elastomer (b) selected from the group consisting of styrene elastomers, polyurethane elastomer, polyester elastomers, polyamide elastomers, polyolefin elastomers and polyvinyl chloride elastomers, the combined content of (a) and (b) being 100% by weight.

2. The heat-fusion composition for molding into multi-layers as claimed in claim 1, further comprising 10 to 50 parts by weight of (c) at least one kind of hard resin selected from the group consisting of an ABS resin, impact resistant polystyrene, polycarbonate, polymethylmethacrylate, polypropylene, saturated polyester resin, polyamide, polyvinyl chloride and polyphenylene oxide resin per 100 parts by weight of (a) and (b).

3. A heat-fusion composition for molding into multi-layers comprising 20 to 80% by weight of a block copolymer having epoxy groups (a), which is an epoxidized block copolymer obtained by epoxiding (i) a block copolymer comprising a polymer block mainly composed of a vinyl aromatic hydrocarbon compound and a polymer block mainly composed of a conjugated diene compound, or (ii) the hydrogenated product of said block copolymer, wherein the epoxidation is effected by peroxidation of the ethylenic double bonds and the epoxy equivalent of the epoxidized block copolymer is 140 to 10,000. and 80% to 20% by weight of at least one kind of thermoplastic elastomer (b) selected from the group consisting of styrene elastomers, polyurethane elastomer, polyester elastomers, polyamide elastomers, polyolefin elastomers and polyvinyl chloride elastomers, the combined content of (a) and (b) being 100% by weight and said composition further comprising 0.01 to 25 parts by weight of (d) a polyfunctional compound containing at least two functional groups reactive to the epoxy group in a molecule and/or 0.001 to 2 parts by weight of (e) an accelerating agent for the curing reaction of epoxy groups per 100 parts by weight of (a) and (b).

4. The heat-fusion composition for molding into multi-layers according to claim 3, wherein (d) the polyfunctional compound is a polyfunctional compound containing at least two identical or different functional groups, selected from the group consisting of an amino group, carboxylic acid anhydride group, phenolic hydroxyl group, hydroxyl group and carboxyl group, in the molecule.

5. The heat-fusion composition for molding into multi-layers according to claim 3, wherein (e) the accelerating agent for the curing reaction of epoxy groups is at least one kind of compound selected from the group consisting of tertiary amines, quaternary amine salts, imidazoles, phosphonium salts and organometallic complexes.

6. A heat-fusion composition for molding into multi-layers comprising 20 to 80% by weight of a block copolymer having epoxy groups (a), which is an epoxidized block copolymer obtained by epoxidizing (i) a block copolymer comprising a polymer block mainly composed of a vinyl aromatic hydrocarbon compound and a polymer block mainly composed of a conjugated diene compound, or (ii) the hydrogenated product of said block copolymer, wherein the epoxidation is effected by peroxidation of the ethylenic double bonds and the epoxy equivalent of the epoxidized block copolymer is 140 to 10,000, and 80 to 20% by weight of at least one kind of thermoplastic elastomer (b) selected from the group consisting of styrene elastomers, polyurethane elastomers, polyester elastomers, polyamide elastomers, polyolefin elastomers and polyvinyl chloride elastomers, the combined content of (a) and (b) being 100% by weight and said composition further comprising 10 to 50 parts by weight of (c) at least one kind of hard resin selected from the group consisting of an ABS resin, impact resistant polystyrene, polycarbonate, polymethacrylate, polypropylene, saturated polyester resin, polyamide, polyvinyl chloride and polyphenylene oxide resin, 0.01 to 25 parts by weight of (d) a polyfunctional compound containing at least two functional groups reactive to epoxy groups and/or 0.001 to 2 parts by weight of (e) an accelerating agent for the curing reaction of epoxy groups per 100 parts by weight of said (a) and (b).

7. The heat-fusion composition for molding into multi-layers according to claim 6, wherein (d) the polyfunctional compound is a polyfunctional compound containing at least two identical or different functional groups, selected from the group consisting of an amino group, carboxylic acid anhydride group, phenolic hydroxyl group, hydroxyl group and carboxyl group, in the molecule.

8. The heat-fusion composition for molding into multi-layers according to claim 6, wherein (e) the accelerating agent for the curing reaction of epoxy groups is at least one kind of compound selected from the group consisting of tertiary amines, quaternary amine salts, imidazoles, phosphonium salts and organometallic complexes.

9. A heat-fusion composition for molding into multi-layers comprising 20 to 80% by weight of a block copolymer having epoxy groups (a), which is an epoxidized block copolymer obtained by epoxidizing a block copolymer comprising a polymer block mainly composed of a vinyl aromatic hydrocarbon compound and a polymer block mainly composed of a conjugated diene compound, wherein the epoxidation is effected by peroxidation of the ethylenic double bonds and the epoxy equivalent of the epoxidized block copolymer is 140 to 10,000, and 80 to 20% by weight of at least one kind of thermoplastic elastomer (b) selected from the group consisting of styrene elastomers, polyurethane elastomers, polyester elastomers, polyamide elastomers, polyolefin elastomers and polyvinyl chloride elastomers, the combined content of (a) and (b) being 100% by weight and said composition further comprising 10 to 50 parts by weight of (c) at least one kind of hard resin selected from the group consisting of an ABS resin, impact resistant polystyrene, polycarbonate, polymethacrylate, polypropylene, saturated polyester resin, polyamide, polyvinyl chloride and polyphenylene oxide resin, 0.01 to 25 parts by weight of (d) a polyfunctional compound containing at least two functional groups reactive to epoxy groups and/or 0.001 to 2 parts by weight of (e) an accelerating agent for the curing reaction of epoxy groups per 100 parts by weight of said (a) and (b).

10. A multi-layer molded body composed of a layer comprising a heat-fusion composition and another layer,
wherein said heat-fusion composition comprises 20 to 80% by weight of a block copolymer having epoxy groups (a), which is an epoxidized block copolymer obtained by epoxidizing (i) a block copolymer comprising a polymer block mainly composed of a vinyl aromatic hydrocarbon compound and a polymer block mainly composed of a conjugated diene compound, or (ii) the hydrogenated product of said block copolymer, wherein the epoxidation is effected by peroxidation of the ethylenic double bonds and the epoxy equivalent of the epoxidized block copolymer is 140 to 10,000, and 80% to 20% by weight of at least one kind of thermoplastic elastomer (b) selected from the group consisting of styrene elastomers, polyurethane elastomers, polyester elastomers, polyamide elastomers, polyolefin elastomers and polyvinyl chloride elastomers, the combined content of (a) and (b) being 100% by weight.

11. The multi-layer molded body according to claim 10, wherein said another layer is composed of at least one kind of hard resin selected from the group consisting of an ABS resin, impact resistant polystyrene, polycarbonate, polymethylmethacrylate, polypropylene, saturated polyester resin, polyamide, polyvinyl chloride and polyphenylene oxide resin.

12. The multi-layer molded body according to claim 11, wherein 0.01 to 25 parts by weight of (d) the polyfunctional compound containing at least two functional groups reactive to the epoxy group and/or 0.001 to 2 parts by weight of (e) the accelerating agent for the curing reaction of epoxy groups are blended with 100 parts by weight of the hard resin of said another layer.

13. The multi-layer molded body according to claim 12, wherein (d) the polyfunctional compound is a polyfunctional compound containing at least two identical or different functional groups, selected form the group consisting of an amino group, carboxylic acid anhydride group, phenolic hydroxyl group, hydroxyl group and carboxylic group, in the molecule.

14. The multi-layer molded body according to claim 12, wherein (e) the accelerating agent for the curing reaction of epoxy groups is at least one kind of compound selected from the group consisting of amines, quaternary amine salts, imidazoles, phosphonium salts and organometallic complexes.

15. A multi-layer molded body composed of a layer comprising heat-fusion composition and another layer, wherein the heat fusion composition comprises 20 to 80% by weight of (a) a block copolymer having epoxy groups, said block copolymer having epoxy groups being an epoxidized block copolymer obtained by epoxidizing (i) a block copolymer comprising a polymer block mainly composed of a vinyl aromatic hydrocarbon compound and a polymer block mainly composed of a conjugated diene compound, or (ii) the hydrogenated product of said block copolymer, wherein the epoxidation is effected by peroxidation of the ethylenic double bonds and the epoxy equivalent of the epoxidized block copolymer is 140 to 10,000, and 20 to 80% by weight of (b) at least one kind of thermoplastic elastomer selected from the group consisting of styrene elastomers, polyurethane elastomers, polyester elastomers, polyamide elastomers, polyolefin elastomers and polyvinyl chloride elastomers, the combined content of (a) and (b) being 100% by weight, and said another layer is composed of at least one kind of hard resin selected from the group consisting of an ABS resin, impact resistant polystyrene, polycarbonate, polymethylmethacrylate, polypropylene, saturated polyester resin, polyamide, polyvinyl chloride and polyphenylene oxide resin, 0.01 to 25 parts by weight of (d) a polyfunctional compound containing at least two functional groups reactive to the epoxy group and/or 0.001 to 2 parts by weight of (e) an accelerating agent for the curing reaction of epoxy groups are blended with 100 parts by weight of the hard resin of said another layer, wherein (d) the polyfunctional compound is a polyfunctional compound containing at least two identical or different functional groups, selected from the group consisting of an amino group, carboxylic acid anhydride group, phenolic hydroxyl group, hydroxyl group and carboxylic group, in the molecule, and (e) the accelerating agent for the curing reaction of epoxy groups is at least one kind of compound selected from the group consisting of amines, quaternary amine salts, imidazoles, phosphonium salts and organometallic complexes.

16. A multi-layer molded body composed of a layer comprising heat-fusion composition and another layer, wherein the heat fusion composition comprises 20 to 80% by weight of (a) a block copolymer having epoxy groups, said block copolymer having epoxy groups being an epoxidized block copolymer obtained by epoxidizing a block copolymer comprising a polymer block mainly composed of a vinyl aromatic hydrocarbon compound and a polymer block mainly composed of a conjugated diene compound wherein the epoxidation is effected by peroxidation of the ethylenic double bonds and the epoxy equivalent of the epoxidized copolymer is 140 to 10,000, and 20 to 80% by weight of (b) at least one kind of thermoplastic elastomer selected from the group consisting of styrene elastomers, polyurethane elastomers, polyester elastomers, polyamide elastomers, polyolefin elastomers and polyvinyl chloride elastomers, the combined content of (a) and (b) being 100% by weight, and said another layer is composed of at least one kind of hard resin selected from the group consisting of an ABS resin, impact resistant polystyrene, polycarbonate, polymethylmethacrylate, polypropylene, saturated polyester resin, polyamide, polyvinyl chloride and polyphenylene oxide resin, 0.01 to 25 parts by weight of (d) a polyfunctional compound containing at least two functional groups reactive to the epoxy group and/or 0.001 to 2 parts by weight of (e) an accelerating agent for the curing reaction of epoxy groups are blended with 100 parts by weight of the hard resin of said another layer, wherein (d) the polyfunctional compound is a polyfunctional compound containing at least two identical or different functional groups, selected from the group consisting of an amino group, carboxylic acid anhydride group, phenolic hydroxyl group, hydroxyl group and carboxylic group, in the molecule, and (e) the accelerating agent for the curing reaction of epoxy groups is at least one kind of compound selected from the group consisting of amines, quaternary amine salts, imidazoles, phosphonium salts and organometallic complexes.

* * * * *